United States Patent
Dharwa et al.

(10) Patent No.: US 10,142,674 B2
(45) Date of Patent: Nov. 27, 2018

(54) SYSTEMS AND METHODS FOR AGGRESSIVELY RECORDING CONTENT WHEN A USER IS NOT AT HOME

(71) Applicant: Rovi Guides, Inc., San Carlos, CA (US)

(72) Inventors: Ashwini Dharwa, Madyha Pradesh (IN); Vikram Makam Gupta, Karnataka (IN)

(73) Assignee: Rovi Guides, Inc., San Jose, CA (US)

(*) Notice: Subject to any disclaimer, the term of this patent is extended or adjusted under 35 U.S.C. 154(b) by 2 days.

(21) Appl. No.: 15/173,140

(22) Filed: Jun. 3, 2016

(65) Prior Publication Data
US 2017/0353757 A1    Dec. 7, 2017

(51) Int. Cl.
| | |
|---|---|
| H04N 5/76 | (2006.01) |
| H04N 21/433 | (2011.01) |
| H04N 21/45 | (2011.01) |
| H04N 21/472 | (2011.01) |
| H04L 12/28 | (2006.01) |
| H04N 21/442 | (2011.01) |

(52) U.S. Cl.
CPC ..... H04N 21/4334 (2013.01); H04L 12/2829 (2013.01); H04N 21/44218 (2013.01); H04N 21/4532 (2013.01); H04N 21/47214 (2013.01)

(58) Field of Classification Search
CPC .............. H04N 21/4334; H04N 21/4532
See application file for complete search history.

(56) References Cited

U.S. PATENT DOCUMENTS

| | | | |
|---|---|---|---|
| 6,771,886 B1 * | 8/2004 | Mendelsohn | H04N 5/782 386/291 |
| 2004/0060071 A1 | 3/2004 | Shteyn | |
| 2009/0172127 A1 * | 7/2009 | Srikanth | G06Q 30/00 709/217 |
| 2013/0058632 A1 * | 3/2013 | Jackson | H04N 5/76 386/296 |
| 2015/0025790 A1 | 1/2015 | Hwang et al. | |
| 2015/0131679 A1 | 5/2015 | Lange et al. | |
| 2015/0331238 A1 | 11/2015 | Roth et al. | |
| 2016/0055879 A1 | 2/2016 | Arai et al. | |
| 2017/0111695 A1 * | 4/2017 | Barton | H04N 21/4583 |

* cited by examiner

Primary Examiner — Thai Tran
Assistant Examiner — Girumsew Wendmagegn
(74) Attorney, Agent, or Firm — Haley Guiliano LLP

(57) ABSTRACT

Systems and methods for automatically recording media assets not explicitly scheduled for recording by a user when the user leaves his or her home. For example, when the user leaves home, a media guidance application, being executed on a user equipment device (such as a set-top box), schedules to record media assets that the user has expressed interest in, but has not explicitly scheduled for recording. If the user returns home before a recording has begun, the media guidance application does not record the media assets the user has not explicitly scheduled for recording.

16 Claims, 11 Drawing Sheets

| Function | Media Asset | Priority | |
|---|---|---|---|
| ~ | Modern Family | User : John | 1 |
| | | User : Steve | 99 |
| | | User : Amy | 10 |
| ~ | The Big Bang Theory | User : John | 50 |
| | | User : Steve | 90 |
| | | User : Amy | 10 |
| ~ | | | |
| ~ | | | |

FIG. 5

| Media Asset | Original Function | Do Not Record? | | Display notification? | |
|---|---|---|---|---|---|
| Modern Family | Reminder | User : John | Yes | All Users | Yes |
| | | User : Steve | No | | |
| | | User : Amy | No | | |
| 702 | 704 | 706 | 708 | 710 | 712 |
| ... | ... | ... | | ... | ... |

FIG. 7

SYSTEMS AND METHODS FOR AGGRESSIVELY RECORDING CONTENT WHEN A USER IS NOT AT HOME

BACKGROUND

Given the sometimes hectic nature of modern life, many consumers find it difficult to keep track of the plethora of media content available today. Interactive program guides (IPGs) typically include features, such as reminders and custom watch lists, to help users remember content they are interested in. For example, many systems schedule a reminder notification for a particular time based on a user input. However, many of these features are only useful when a user is at home. If the user is not at home, he or she will not be able to view the content, unless a recording is scheduled.

In some current systems, contact information for remote devices associated with a user is stored in a database and reminder notifications are transmitted to one of the user's devices if they are not at home. Upon receiving the notification, users may manually schedule a recording from their mobile device (i.e., remote recording), which transmits an instruction to a digital video recorder in his or her home to record a particular media asset. However, if the user does not have any of his or her devices on hand at a specific time when he or she is not at home, the user may miss the opportunity to schedule a recording, and by extension miss the media asset.

SUMMARY

Accordingly, systems and methods are described for automatically recording media assets not explicitly scheduled for recording by a user when the user leaves his or her home. When the user leaves home, a media guidance application, being executed on a user equipment device (such as a set-top box), schedules to record media assets that the user has expressed interest in, but has not explicitly scheduled for recording. If the user returns home before a recording has begun, the media guidance application does not record the media assets the user has not explicitly scheduled for recording. The system aggregates information from a variety of sources (e.g., social media, favorite program lists, etc.) to determine content the user is interested in and stores this information in a database, which is accessed when the user leaves. Media assets are chosen to record based on comparisons of currently airing media assets with the database, even though the user did not explicitly schedule those media assets to record. This represents a concrete and non-abstract improvement over conventional systems. By utilizing a database of stored user commands and preferences, the system determines media assets the user would likely record and automatically records them.

In some aspects, the media guidance application determines a command indicating interest in a media asset. For example, the media guidance application may determine that the user has expressed interest in a particular media asset, e.g., "Modern Family," but has not explicitly scheduled the media asset for recording. The media guidance application determines whether an activity of the user, such as scheduling a reminder, adding a media asset to a watch list or favorites list, or posting on social media about the media asset, constitutes the command expressing interest. In response to determining the user has expressed interest in the media asset, the media guidance application determines that the activity of the user is the command indicating interest in the media asset. For example, since the user scheduled a reminder for "Modern Family" the system determines this constitutes the command indicating interest in the media asset "Modern Family."

In some embodiments, the media guidance application accesses a social media profile associated with the user. For example, the media guidance application may access a profile of the user on a social networking website. The media guidance application retrieves information input by the user on the social media profile. For example, the media guidance application retrieves text from a post by the user stating, "I really want to watch 'The Flash,' do people like it?" The media guidance application analyzes the retrieved information for references to media assets. For example, the media guidance application compares the text of the retrieved post with identifiers of media assets retrieved from a media guidance data source. The reference to a media asset could be text or an image of an actor, director, or other person or attribute associated with the media asset. The media guidance application determines that the retrieved information includes a reference to the media asset. For example, based on comparing the text of the retrieved post with identifiers of media assets retrieved from a media guidance data source, the media guidance application determines "The Flash" is a reference to the series "The Flash."

The media guidance application determines, from the context of the reference, whether the reference constitutes the command. For example, the media guidance application may analyze the context of the reference to the media asset based on surrounding words in the post. If the post contained the word "hate," such as, "I really hate the show, 'The Flash,'" the media guidance application may determine that the reference to "The Flash" in the post does not constitute the command. The media guidance application, in response to determining, from the context of the reference, that the reference constitutes the command, receives the reference as the command indicating interest in the media asset. For example, the media guidance application may store an indication in a user profile for the user that "The Flash" is a show that the user is interested in.

In some embodiments, the media guidance application selects the media asset from a plurality of media assets available from a media content source. For example, the media guidance application may retrieve information for an upcoming media asset before or during the time the user is not at home. The media guidance application accesses a user profile corresponding to the user. For example, multiple users in a family may use the same set-top box and have different viewing preferences. A child may commonly view children's programming, while a father may view family comedies. The media guidance application may determine the user who is watching a media asset at a given time via user input of a password or other identifier, biometric identifiers, or any other attribute for differentiating users. This allows the media guidance application to store viewing histories and other lists that are user-specific.

The media guidance application then retrieves from the user profile a viewing history for the user including a plurality of media assets with associated characteristics. For example, the media guidance application retrieves the media asset, "The Middle" from the user profile for the father, which has the associated characteristics, "family" and "situational comedy." The media guidance application determines whether a first characteristic associated with the plurality of media assets is also associated with the selected media asset. For example, the media guidance application compares the characteristics of media assets the father has already watched (e.g., "The Middle") with those that he might miss by being away from home, for example the media asset, "Modern Family." In response to determining the first characteristic associated with the plurality of media assets is also associated with the media asset, the media guidance application receives the viewing history as the command indicating interest in the media asset. For example, since "Modern Family" is also a "family" media asset and "situational comedy" like "The Middle," the media guidance application receives the viewing history of the father as the command indicating interest in "Modern Family" and may schedule the media asset for recording if the father is not at home.

The media guidance application associates, based on the command, a first function with the media asset, wherein the first function is not a recording function. The first function may be any scheduled alert or indication of general interest in a media asset, such as a reminder message for an episode or series, an entry of a watch list, an entry of a favorite program list, or an entry of a general interest list in a user profile. For example, in response to a user selecting an option to create a reminder message for the media asset, "Modern Family," the media guidance application associates a reminder function with that media asset. As another example, in response to a user adding a media asset to a watch list, the media guidance application creates an entry for the media asset on the watch list, which may be stored in a separate database referenced by the functions database or contained in the functions database.

The media guidance application stores the association of the first function with the media asset in an entry of a functions database containing a plurality of media assets and associated functions. For example, the functions database may be organized as a table where each row contains a different media asset and an associated function. The functions database may optionally contain information about the time, channel, and user that set the function. The functions database may be stored locally in memory, or remotely at a media guidance data source. Continuing the example above, the media guidance application stores an entry (e.g., creates a new row in the table) containing the media asset "Modern Family" and the function "reminder."

The media guidance application receives an indication that the user is not at home. For example, the media guidance application detects that the user has left home by monitoring a smart lock, RFID chip in the user's mobile phone, or other methods. The media guidance application, in response to determining that the user is not at home, replaces the entry in the functions database for the media asset with a recording function. For example, when the media guidance application determines the user is not at home, the media guidance application replaces the "reminder" function with a "record" function for the media asset "Modern Family."

In some embodiments, the media guidance application determines, based on hardware limitations, a number of media assets that can be recorded. For example, the media guidance application determines the user has expressed interest in ten media assets from 7:00 pm-7:30 pm. However, the media guidance application may only have capability to receive five media assets during that timeframe (e.g., there are only five tuners, or there are memory constraints). The media guidance application retrieves the entry in the functions database for the media asset. For example, the media guidance application may access data in the functions database, such as the row containing "Modern Family" and the function "record," by executing a database query language script, such as SQL, and utilizing the declarative "Select" command to access data in a particular expression.

The media guidance application assigns a priority to the media asset. In some embodiments, the priority assignment is done when the function is associated with the media asset and stored in the functions database. In other embodiments, priority is assigned only when the media guidance application detects that hardware will limit the number of media assets that can be recorded. The priority may be user-specific based on interest expressed by individual users, or could be tied to use of the media guidance application as a whole. The priority may be expressed as a number, percentage, or any other method of ranking. As an example, the media guidance application determines that the user did not select "Modern Family" for recording and it was originally stored as a "reminder," as such, the media guidance application may assign a lower priority based on a pre-defined rules set, such as 3 out of 10 to "Modern Family."

In some embodiments, the media guidance application determines, from the command indicating interest in the media asset, an identity of the user. For example, as described above, the media guidance application determines the user that is accessing a media asset at a particular time via user input of a password or other identifier, biometric identifiers, or any other attribute for differentiating users. The media guidance application accesses a user profile corresponding to the user stored in the database. For example, a plurality of user profiles may be stored each with their own functions database or there may be a central master functions database with a column identifying which user is a particular function for a media asset.

The media guidance application compares characteristics of the media asset to characteristics stored in the user profile. For example, the media guidance application may retrieve keywords associated with media assets from a viewing history, watch list, or general interest list of the user stored in the user profile. As a specific example, the user may watch a variety of media assets tagged with the keyword "mystery." The media guidance application determines the priority of the media asset based on the comparison. For example, the media guidance application may determine a degree of similarity between media assets stored in the user profile and the media asset. If multiple keywords, or the same keyword in multiple media assets stored in the user profile, match the media asset, the media guidance application may assign a higher priority (e.g., 6 out of a possible 10) than if only a single keyword of a single media asset matched (e.g., 3 out of 10). The rules for determining the priority are pre-defined and may be customized by the user to rank particular media assets higher (e.g., movies).

In some embodiments, the media guidance application presents to the user options to customize the priorities of the plurality of media assets stored in the database containing the plurality of media assets and associated functions. For example, the media guidance application generates for display a graphical user interface that allows a user to manually edit the priorities of various media assets stored in the database by selecting options to reorder the media assets (e.g., via drag-and-drop using a user input interface as described in FIG. 10). The media guidance application receives a selection by the user of a first option. For example, the user may select an option to "move up" the media asset, "The Flash" so that it has a higher priority than "Modern Family," which is currently prioritized higher. The media guidance application, in response to the user selection, reassigns the priority of the media asset. For example, the media guidance application switches the priority of "The Flash" with the priority of "Modern Family."

The media guidance application compares the priority of the media asset to priorities of the plurality of media assets stored in the functions database. For example, the media guidance application ranks the media assets based on whether they overlap (e.g., it ranks the ten media assets from 7:00 pm-7:30 pm). The media guidance application determines whether a first number of media assets, given by the media asset in addition to media assets with a higher priority than the media asset, is less than the number of media assets that can be recorded. For example, if there are only three media assets with a higher priority than "Modern Family" in the same time slot, the media guidance application may determine that "Modern Family" can be recorded if five media assets can be recorded at once. The media guidance application, in response to determining the first number of media assets is less than the number of media assets that can be recorded, updates the entry in the database for the media asset to include a recording function. For example, the entry for "Modern Family" may be updated to "record" from "reminder."

The media guidance application, subsequent to replacing the entry in the functions database for the media asset with the recording function, receives an indication that the user is at home. For example, the media guidance application detects that the user has returned home by monitoring a smart lock, RFID chip in the user's mobile phone, or other methods.

The media guidance application then determines whether the recording function associated with the media asset has begun. For example, the media guidance application may determine that since the media asset "Modern Family" begins at 7:00 pm, but the user has returned home at 6:45 pm, the recording of the media asset "Modern Family" has not yet begun.

The media guidance application, in response to determining the recording function associated with media asset has not begun, replaces the entry in the database for the media asset with the first function. For example, the media guidance application replaces the "record" function with the "reminder" function that was originally selected by the user for the media asset "Modern Family."

In some embodiments, the media guidance application determines that the user has returned home. For example, the media guidance application receives an indication from a smart lock that the user has returned home. Upon determining the user has returned home, the media guidance application determines from a recording log stored in the functions database, whether the media asset was recorded in response to updating the entry for the media asset to include the recording function. The recording log contains a list of all media assets that have been recorded and, in some embodiments, may include an indication of the user that scheduled each recording. For example, the media guidance application recorded "Modern Family" even though it was scheduled as a reminder, not a recording, by the user. Thus, the media guidance application determines "Modern Family" was recorded in response to updating the entry for "Modern Family." The media guidance application, in response to determining the media asset was recorded in response to updating the entry for the media asset to include the recording function, generates for display a notification that the media asset was recorded. For example, the media guidance application generates for display a notification that "The program 'Modern Family' was recorded while you were away." The notification optionally may include the first function associated with "Modern Family" (e.g., that a "reminder" was originally set).

The media guidance application generates for display a selectable option to not record the media asset. For example, the media guidance application presents along with the notification that "Modern Family" was recorded a selectable button, which may be labeled with text "Do not record." The media guidance application, in response to receiving the selection, stores, in the database containing a plurality of media assets and associated functions, an instruction to not update the entry for the media asset to include the recording function during a next time the system determines the user is not at home. For example, the database may contain a column that stores a Boolean value for whether to update the function to automatically record the media asset of the associated row if the user is not at home. For example, upon receiving a selection of "Do not record" for the media asset, "Modern Family," the media guidance application stores "False" in the automatic recording column for the row associated with "Modern Family," as such, "Modern Family" will not automatically be recorded when the user leaves home next time.

In some embodiments, the media guidance application retrieves, from the recording log, an indication of the user associated with the command. For example, the media guidance application stores an indication of which user of a particular user equipment device the recording was scheduled for. If a father added "Modern Family" to a watch list and no other users have expressed interest in the media asset, the media guidance application may store in a particular field in the log associated with "Modern Family" an identifier of the father, such as a user name "Dad1975." The media guidance application retrieves this string when the media guidance application receives an indication the user has returned home. The media guidance application then generates for display an identifier of the user and that the media asset was recorded in response to determining the user indicated interest in the media asset. For example, the media guidance application may generate for display that "Modern Family was recorded for user Dad1975" when the father returns home.

In some embodiments, the media guidance application accesses the recording log stored in the functions database. For example, the media guidance application may access the functions database stored locally in memory or remotely (e.g., at a media guidance data source) via a communications network. The media guidance application generates for display an entry in the recording log including an identifier of the media asset, the associated function of the media asset, and the priority of the media asset. For example, the media guidance application may generate for display the entry for "Modern Family," along with the associated first function (e.g., that it was originally scheduled as a "reminder"), and the priority (e.g., 3 out of 10). The media guidance application may also generate for display an option to not automatically record "Modern Family" in the future. In this way, a user may update media assets to automatically record that he or she initially didn't want to automatically record, and vice versa.

The media guidance application receives a user selection to edit the entry. For example, the media guidance application may receive, via a user input interface (e.g., as described further in FIG. 10 below), a selection to edit the entry. The user may change any of the variable attributes of the recording log, such as the priority and whether or not to automatically record when the user is not at home. However, the media guidance application may not allow editing of certain attributes that are constant, like the title of the media asset. The media guidance application updates the entry in the recording log based on the user edits. For example, the media guidance application overwrites the fields in the entry that the user changed. For example, if the user edited the entry to reflect that automatic recording of "Modern Family" should not occur when the user is not at home, the media guidance application may update a Boolean value for whether to automatically record "Modern Family" to "False."

In some aspects, the media guidance application may continually monitor whether the user is not at home and switch functions associated with media assets at the scheduled time of the functions. For example, a reminder message for "Modern Family" at a time of 7:00 pm may be switched to a recording function at 7:00 pm instead of at the time the user leaves home (e.g., 5:00 pm). In this configuration, the media guidance application need not contemplate the situation where the function has been switched to a recording but the user returns home, since the function will only be switched to a recording at the time for which the function is scheduled.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 5 shows an illustrative example of a table where a function associated with a media asset is updated in accordance with some embodiments of the disclosure;

FIG. 7 shows an illustrative example of a table where a function associated with a media asset is updated in accordance with some embodiments of the disclosure;

DETAILED DESCRIPTION

Accordingly, systems and methods are described for automatically recording media assets not explicitly scheduled for recording by a user when the user leaves his or her home. When the user leaves home, a media guidance application executed on a user equipment device (such as a set-top box) schedules to record media assets that the user has expressed interest in, but has not explicitly scheduled for recording. If the user returns home before a recording has begun, the media guidance application does not record the media assets the user has not explicitly scheduled for recording.

In some aspects, the media guidance application may continually monitor whether the user is not at home and switch functions associated with media assets at the scheduled time of the functions. For example, a reminder message for "Modern Family" at a time of 7:00 pm may be switched to a recording function at 7:00 pm instead of at the time the user leaves home (e.g., 5:00 pm). In this configuration, the media guidance application need not contemplate the situation where the function has been switched to a recording but the user returns home, since the function will only be switched to a recording at the time for which the function is scheduled.

As referred to herein, a "media guidance application," or an "interactive media guidance application" or, sometimes, a "media guidance application" or a "guidance application" is an application that allows a user to consume, and/or navigate to, media assets. In some embodiments, the media guidance application may be provided as an online application (i.e., provided on a website), or as a stand-alone application on a server, user device, etc. In some embodiments, the media guidance application may be executed on the first device and a second device simultaneously, or at a location remote from either device (e.g., a remote server), or any suitable combination. In some embodiments, control circuitry installed on various devices and platforms may execute the media guidance application, as described in more detail below. In some embodiments, the media guidance application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and nonvolatile computer memory or storage devices such as a hard disk, floppy disk, USB drive, DVD, CD, media card, register memory, processor caches, Random Access Memory ("RAM"), etc.

Figure 1:
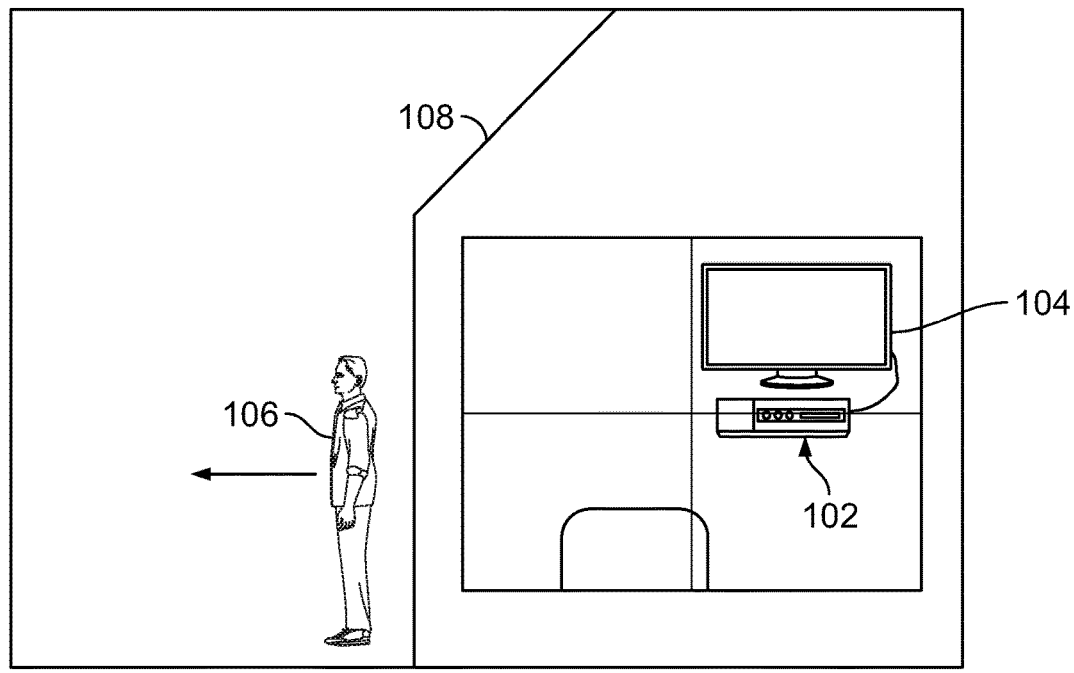
FIG. 1 shows an illustrative example of a user equipment device functioning as a user leaves home in accordance with some embodiments of the disclosure.

FIG. 1 shows an illustrative example of a user equipment device functioning as a user leaves home in accordance with some embodiments of the disclosure. For example, set-top box 102 executes a media guidance application which manages the hardware resources of set-top box 102 and generates media assets for display on display 104. User 106 as shown is leaving home 108, which may be detected by a variety of devices and relayed to the media guidance application. Display 104 may appear on any of the user equipment devices listed in FIGS. 9-10 below. Moreover, the media guidance application may use one or more of the processes described in FIGS. 12-14 below to generate display 104 or any of the features described therein.

In some aspects, the media guidance application determines a command indicating interest in a media asset. For example, the media guidance application may determine that user 106 has expressed interest in a particular media asset, e.g., "Modern Family," but has not explicitly scheduled the media asset for recording. The media guidance application determines whether an activity of user 106, such as scheduling a reminder, adding a media asset to a watch list or favorites list, or posting on social media about the media asset, constitutes the command expressing interest. In response to determining the user has expressed interest in the media asset, the media guidance application determines the activity of the user is the command indicating interest in the media asset. For example, since user 106 scheduled a reminder for "Modern Family," the media guidance application determines this constitutes the command indicating interest in the media asset "Modern Family."

In some embodiments, the media guidance application selects the media asset from a plurality of media assets available from a media content source. For example, the media guidance application may retrieve information for an upcoming media asset before or during the time the user is not at home. The media guidance application accesses a user profile corresponding to the user. For example, multiple users in a family may use the same set-top box and have different viewing preferences. A child may commonly view children's programming, while a father may view family comedies. The media guidance application may determine the user (e.g., user 106) who is watching a media asset at a given time via user input of a password or other identifier, biometric identifiers, or any other attribute for differentiating users. This allows the media guidance application to store viewing histories and other lists that are user-specific.

The media guidance application then retrieves from the user profile a viewing history for the user including a plurality of media assets with associated characteristics. For example, the media guidance application retrieves the media asset, "The Middle" from the user profile for the father, which has the associated characteristics, "family" and "situational comedy." The media guidance application determines whether a first characteristic associated with the plurality of media assets is also associated with the media asset. For example, the media guidance application compares the characteristics of media assets the father has already watched (e.g., "The Middle") with those that he might miss by being away from home, for example the media asset, "Modern Family."

In response to determining the first characteristic associated with the plurality of media assets is also associated with the media asset, the media guidance application receives the viewing history as the command indicating interest in the media asset. For example, since "Modern Family" is also a "family" media asset and "situational comedy" like "The Middle," the media guidance application retrieves the viewing history of the father as the command indicating interest in "Modern Family" and may schedule the media asset for recording if the father is not at home.

The media guidance application associates, based on the command, a first function with the media asset, wherein the first function is not a recording function. The first function may be any scheduled alert or indication of general interest in a media asset, such as a reminder message for an episode or series, an entry of a watch list, an entry of a favorite program list, or an entry of a general interest list in a user profile. For example, in response to user 106 selecting an option to create a reminder message for the media asset, "Modern Family," the media guidance application associates a reminder function with that media asset. As another example, in response to user 106 adding a media asset to a watch list, the media guidance application creates an entry for the media asset on the watch list, which may be stored in a separate database referenced by the functions database or contained in the functions database.

The media guidance application stores the association of the first function with the media asset in an entry of a functions database containing a plurality of media assets and associated functions. For example, the functions database may be organized as a table where each row contains a different media asset and an associated function. The functions database may optionally contain information about the time, channel, and user that set the function. The functions database may be stored locally in memory, or remotely at a media guidance data source. The functions database may be designed in a self-referencing manner, where information about each user, their viewing histories, functions scheduled, and the recording log may all be contained non-contiguously in a single table and linked via pointers to the appropriate fields in the table. For example, the viewing history of a particular user may be in column 12, which is pointed to by an entry in a row for the user. Continuing the example above, the media guidance application stores an entry (e.g., creates a new row in the table) containing the media asset "Modern Family" and the function "reminder."

The media guidance application receives an indication that the user is not at home. For example, the media guidance application detects that the user has left home 108 by monitoring a smart lock, RFID chip in a mobile phone of user 106, or other methods. The media guidance application, in response to determining that the user is not at home, replaces the entry in the functions database for the media asset with a recording function. For example, when the media guidance application determines the user is not at home 108, the media guidance application replaces the "reminder" function with a "record" function for the media asset "Modern Family."

Figure 2:
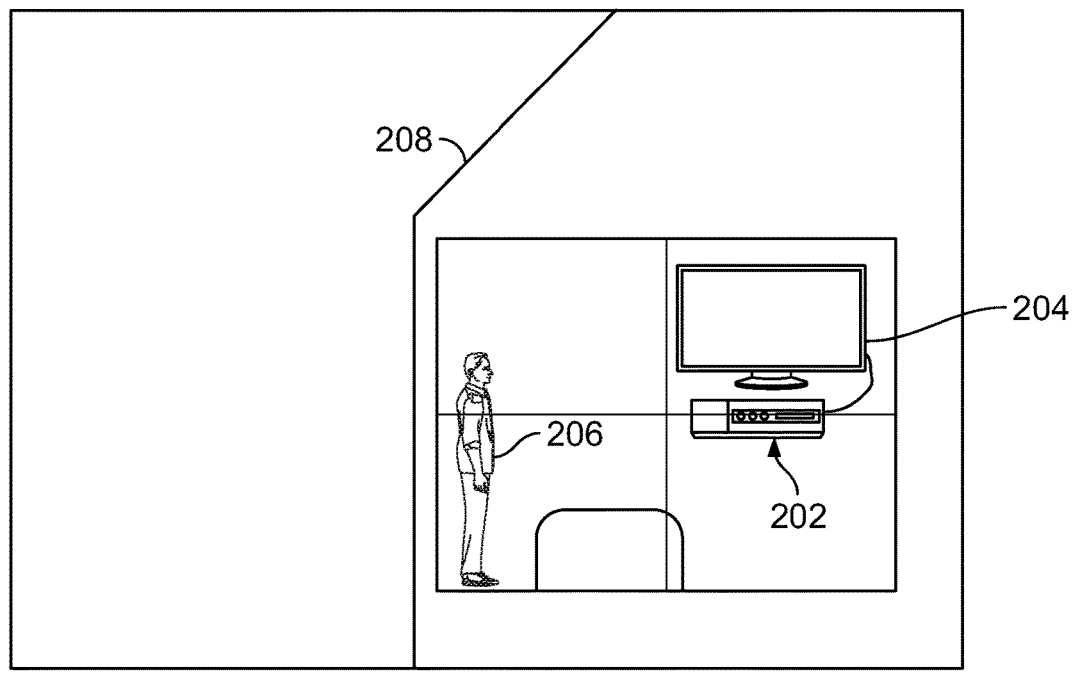
FIG. 2 shows an illustrative example of a user equipment device functioning as a user enters home in accordance with some embodiments of the disclosure.

FIG. 2 shows an illustrative example of a user equipment device functioning as a user enters home in accordance with some embodiments of the disclosure. For example, set-top box 202 executes a media guidance application which manages the hardware resources of set-top box 202 and generates media assets for display on display 204. User 206, as shown, is entering home 208, which may be detected by a variety of devices and relayed to the media guidance application. Display 204 may appear on any of the user equipment devices listed in FIGS. 9-10 below. Moreover, the media guidance application may use one or more of the processes described in FIGS. 12-14 below to generate display 204 or any of the features described therein.

The media guidance application, subsequent to replacing the entry in the functions database for the media asset with the recording function, receives an indication that user 206 is at home 208. For example, media guidance application detects that user 206 has returned to home 208 by monitoring a smart lock, RFID chip in the user's mobile phone, or other methods.

The media guidance application then determines whether the recording function associated with the media asset has begun. For example, the media guidance application may determine that since the media asset "Modern Family"

begins at 7:00 pm, but user 106 returned to home 108 at 6:45 pm, the recording of the media asset "Modern Family" has not yet begun.

The media guidance application, in response to determining the recording function associated with the media asset has not begun, replaces the entry in the database for the media asset with the first function. For example, the media guidance application replaces the "record" function with the "reminder" function that was originally selected by user 106 for media asset "Modern Family."

Figure 3:
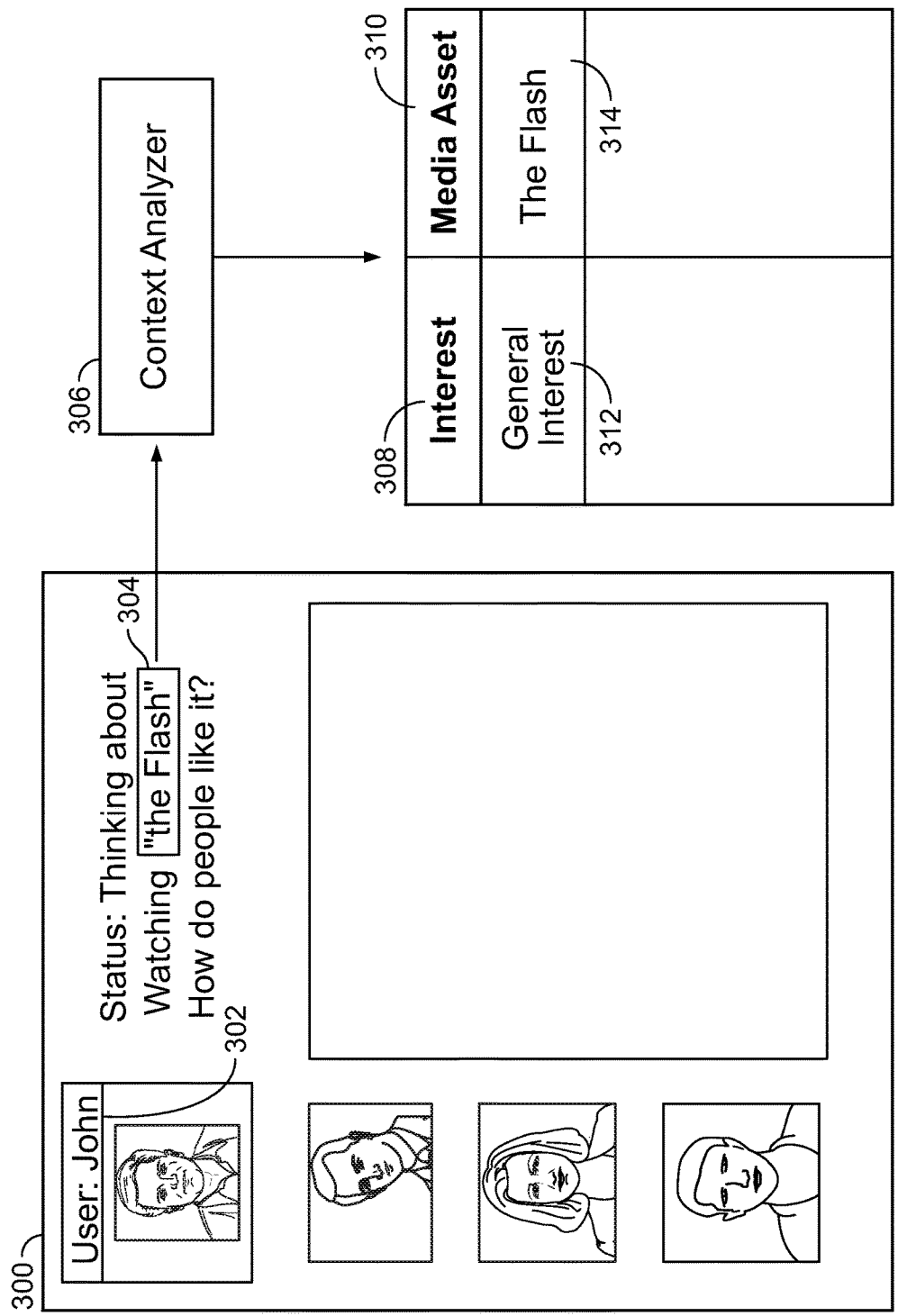
FIG. 3 shows an illustrative example of a media guidance application determining a user has expressed interest in a media asset from a social media account in accordance with some embodiments of the disclosure.

FIG. 3 shows an illustrative example of a media guidance application determining a user has expressed interest in a media asset from a social media account in accordance with some embodiments of the disclosure. For example, social media page 300 is associated with user 302 and posts, such as post 304 by user 302. Context analyzer 306 analyzes the content of post 304 to determine if media assets are referenced. Content analyzer 306 may be a module of the media guidance application running on a user equipment device (e.g., set-top box 102). Context analyzer 306 may store in a database of interest level 308 and associated media assets 310 individual indications of user interest in a media asset (e.g., general interest 312 in media asset 314). Context analyzer 306 may be executed by the media guidance application on any of the user equipment devices listed in FIGS. 9-10 below. Moreover, the media guidance application may use one or more of the processes described in FIGS. 12-14 below to execute context analyzer 306 or any of the features described therein.

In some embodiments, the media guidance application accesses a social media profile associated with the user. For example, the media guidance application may access a profile of user 302 on social media page 300. The media guidance application retrieves information input by the user on the social media profile. For example, the media guidance application retrieves text from post 304 by user 302 stating, "Thinking about watching, 'The Flash,' how do people like it?" The media guidance application analyzes the retrieved information for references to media assets. For example, the media guidance application compares the text of post 304 with identifiers of media assets retrieved from a media guidance data source. The reference to a media asset could be text or an image of an actor, director, or other person or attribute associated with the media asset. The media guidance application determines that the retrieved information includes a reference to the media asset. For example, based on comparing the text of the retrieved post 304 with identifiers of media assets retrieved from a media guidance data source, the media guidance application determines "The Flash" is a reference to the series "The Flash."

The media guidance application determines, from the context of the reference, whether the reference constitutes the command. For example, the media guidance application may execute context analyzer 306 which analyzes the context of the reference to the media asset based on surrounding words in post 304. If the post contained the word "hate," such as, "I really hate the show, 'The Flash,'" the media guidance application may determine that the reference to "The Flash" in the post does not constitute the command. Context analyzer 306 may additionally determine levels of interest based on a pre-defined rule set governing user interest in a media asset. For example, if a user posts the phrase "Can't wait for tonight" in addition to "new episode" and the reference, the context analyzer may store an indication that there is "strong interest," which may be reflected in prioritizing recordings as discussed below in FIG. 5.

The media guidance application, in response to determining, from the context of the reference, that the reference constitutes the command, receives the reference as the command indicating interest in the media asset. For example, the media guidance application may store an indication in a table (e.g., in a functions database as described further below in FIGS. 4-5), which may be user-specific, that "The Flash" is a show that the user is interested in. The table may contain an indication of interest level 308 for each media asset 310. For example, the media guidance application may store an indication of general interest 312 for media asset 314, "The Flash."

Figure 4:
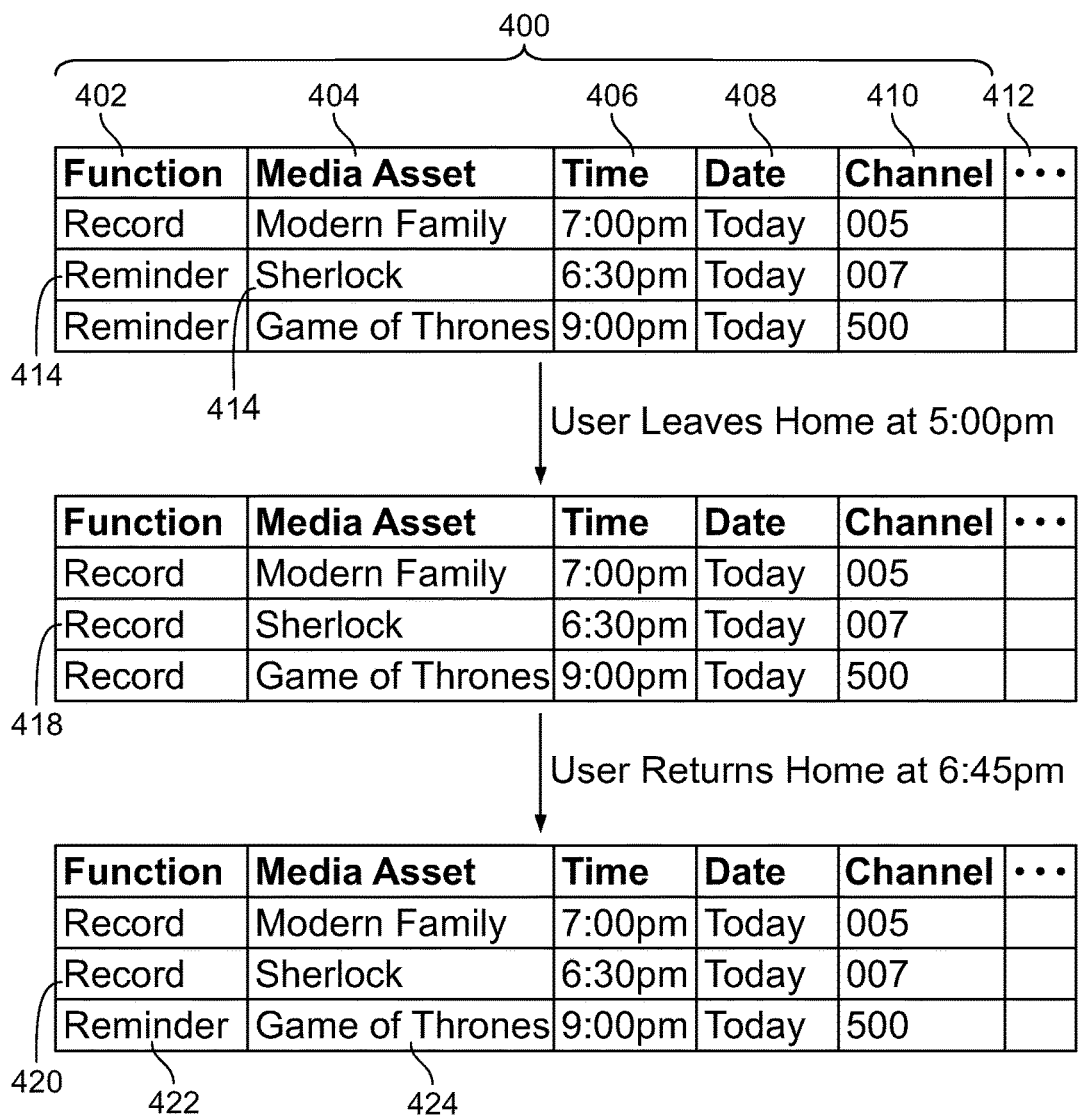
FIG. 4 shows an illustrative example of a table where a function associated with a media asset is updated in accordance with some embodiments of the disclosure.

FIG. 4 shows an illustrative example of a table where a function associated with a media asset is updated in accordance with some embodiments of the disclosure. For example, table 400 contains information about functions 402 associated with media assets 404, as well as the times 406, dates 408, channels 410, and additional information 412. Table 400 may be stored in memory (e.g., storage as described in FIG. 10) on one or more user devices (e.g., any of the devices listed in FIGS. 10-11 below). Moreover, the media guidance application may use one or more of the processes described in FIGS. 12-14 below to generate table 400 or any of the features described therein.

The media guidance application stores the association of the first function with the media asset in an entry of a functions database containing a plurality of media assets and associated functions. For example, the functions database may be organized as table 400 where each row contains a different media asset (e.g., media asset 416 "Sherlock") and an associated function (e.g., reminder 414). Table 400 contains information such as times 406, channels 410, and additional information 412 (e.g., the user that set the function). The functions database may be stored either locally in memory (e.g., storage 908), or remotely at a media guidance data source (e.g., media guidance data source 1018) accessible via a communications network (e.g., communications network 1014), as described further in FIGS. 9-10 below). As an example, the media guidance application stores an entry (e.g., creates a new row in the table) containing media asset 416 "Sherlock" and reminder 414, when a command is determined as described above in FIGS. 1-3.

The media guidance application receives an indication that the user is not at home. For example, the media guidance application detects that the user has left home at 5:00 pm by monitoring a smart lock, RFID chip in a mobile phone of the user, or other methods. The media guidance application, in response to determining that the user is not at home, replaces the entry in the functions database for the media asset with a recording function. For example, when the media guidance application determines the user is not at home, the media guidance application replaces reminder 414 with record 418 for media asset 416, "Sherlock."

The media guidance application, subsequent to replacing the entry in the functions database for the media asset with the recording function, receives an indication that the user is at home. For example, media guidance application detects that the user has returned home at 6:45 pm by monitoring a smart lock, RFID chip in the user's mobile phone, or other methods.

The media guidance application then determines whether the recording function associated with the media asset has begun. For example, the media guidance application may determine that since the media asset "Sherlock" begins at 6:30 pm, but the user returned home at 6:45 pm, the recording of the media asset "Sherlock" has already begun. Conversely, the media guidance application may determine that the recording for media asset 424, "Game of Thrones," has not yet begun since it is not scheduled to record until 9:00 pm.

The media guidance application, in response to determining the recording function associated with media asset has not begun, replaces the entry in the database for the media asset with the first function. For example, the media guidance application replaces the "record" function with reminder 422 that was originally selected by the user for media asset 424 "Game of Thrones." However, since the recording has already begun for media asset 416, "Sherlock," the media guidance application does not replace record 420.

FIG. 5 shows an illustrative example of a table where a function associated with a media asset is updated in accordance with some embodiments of the disclosure. For example, table 500 contains information about functions associated with media assets, as described in FIG. 4 above, as well as priorities 504, which may be associated with individual users for each media asset. Table 500 may be stored in memory (e.g., storage as described in FIG. 10) on one or more user devices (e.g., any of the devices listed in FIGS. 10-11 below). Moreover, the media guidance application may use one or more of the processes described in FIGS. 12-14 below to generate table 500 or any of the features described therein.

In some embodiments, the media guidance application determines, based on hardware limitations, a number of media assets that can be recorded. For example, the media guidance application may determine the user has expressed interest in ten media assets from 7:00 pm-7:30 pm. However, the media guidance application may only have capability to receive five media assets during that timeframe (e.g., there are only five tuners, or there are memory constraints). The media guidance application retrieves the entry in the functions database for the media asset. For example, the media guidance application may access data in the functions database, such as the row containing media asset 506 "Modern Family" and its associated function "record," by executing a database query language script, such as SQL, and utilizing the declarative "Select" command to access data in a particular expression.

The media guidance application assigns a priority to the media asset. In some embodiments, the priority assignment is done when the function is associated with the media asset and stored in the functions database. In other embodiments, priority is assigned only when the media guidance application detects that hardware will limit the number of media assets that can be recorded. The priority may be user-specific based on interest (e.g., as determined from social media posts described above in FIG. 3, watch lists, etc.) expressed by individual users, such as user 508, "John," or could be tied to use of the media guidance application as a whole. The priority may be expressed as a number, percentage, or any other method of ranking. As an example, the media guidance application may determine that user 508 did not select "Modern Family" for recording and it was originally stored as a "reminder," as such, the media guidance application may assign a lower priority based on a pre-defined rules set, such as priority 510, "1 out of 100," to "Modern Family." The media guidance application may assign media assets that were scheduled for recording by user 508 a higher priority, such as priority 514, "50 out of 100," to media asset 512, "The Big Bang Theory." In this way, the media guidance application ensures that media assets that user 508 explicitly scheduled record over media assets that user 508 did not explicitly schedule.

In some embodiments, the media guidance application determines, from the command indicating interest in the media asset, an identity of the user. For example, as described above (e.g., in FIGS. 1-3), the media guidance application determines the user that is accessing a media asset at a particular time via user input of a password or other identifier, biometric identifiers, or any other attribute for differentiating users. As an example, the media guidance application may determine from a passcode specific to user 508, "John," that he is currently viewing a particular media asset. The media guidance application accesses a user profile corresponding to the user stored in the database. For example, a plurality of user profiles may be stored each with their own functions database or there may be a central master functions database with a column identifying which user is associated with scheduling a particular function for a media asset.

The media guidance application compares characteristics of the media asset to characteristics stored in the user profile. For example, the media guidance application may retrieve keywords associated with media assets from a viewing history, watch list, or general interest list of user 508 stored in the user profile. As a specific example, user 508 may watch a variety of media assets tagged with the keyword "science." The media guidance application determines the priority of the media asset based on the comparison. For example, the media guidance application may determine a degree of similarity between media assets stored in the user profile and the media asset (e.g., media asset 506 or 512). If multiple keywords, or the same keyword in multiple media assets stored in the user profile, match the media asset, the media guidance application may assign a higher priority (e.g., 6 out of a possible 10) than if only a single keyword of a single media asset matched (e.g., 3 out of 10). The rules for determining the priority are pre-defined and may be customized by the user to rank particular media assets higher (e.g., movies).

In some embodiments, the media guidance application presents to the user options to customize the priorities of the plurality of media assets stored in the database containing the plurality of media assets and associated functions. For example, the media guidance application generates for display a graphical user interface that allows user 508 to manually edit the priorities of various media assets (e.g., media asset 506 or 512) stored in the database by selecting options to reorder the media assets (e.g., via drag-and-drop using a user input interface as described below in FIG. 10). The media guidance application receives a selection by the user of a first option. For example, user 508 may select an option to "move up" media asset 506, "Modern Family" so that it has a higher priority than media asset 512, "The Big Bang Theory," which is currently prioritized higher. The media guidance application, in response to the user selection, reassigns the priority of the media asset. For example, the media guidance application switches priority 514 and priority 510. As another example, the media guidance application may account for other media assets and adjust their priorities accordingly, so that switching priority 514 and 510 does not change the relative order of priorities of other media assets.

The media guidance application compares the priority of the media asset to priorities of the plurality of media assets stored in the functions database. For example, the media guidance application ranks the media assets based on whether they overlap (e.g., it ranks the ten media assets from 7:00 pm-7:30 pm). The media guidance application determines whether a first number of media assets, given by the media asset in addition to media assets with a higher priority than the media asset, is less than the number of media assets that can be recorded. For example, if there are only three media assets with a higher priority than media asset 506 in the same time slot, the media guidance application may determine that media asset 506 can be recorded if five media assets can be recorded at once. The media guidance application, in response to determining the first number of media assets is less than the number of media assets that can be recorded, updates the entry in the database for the media asset to include a recording function. For example, the entry for media asset 506 may be updated to "record" from "reminder," as described above in FIG. 1.

Figure 6:
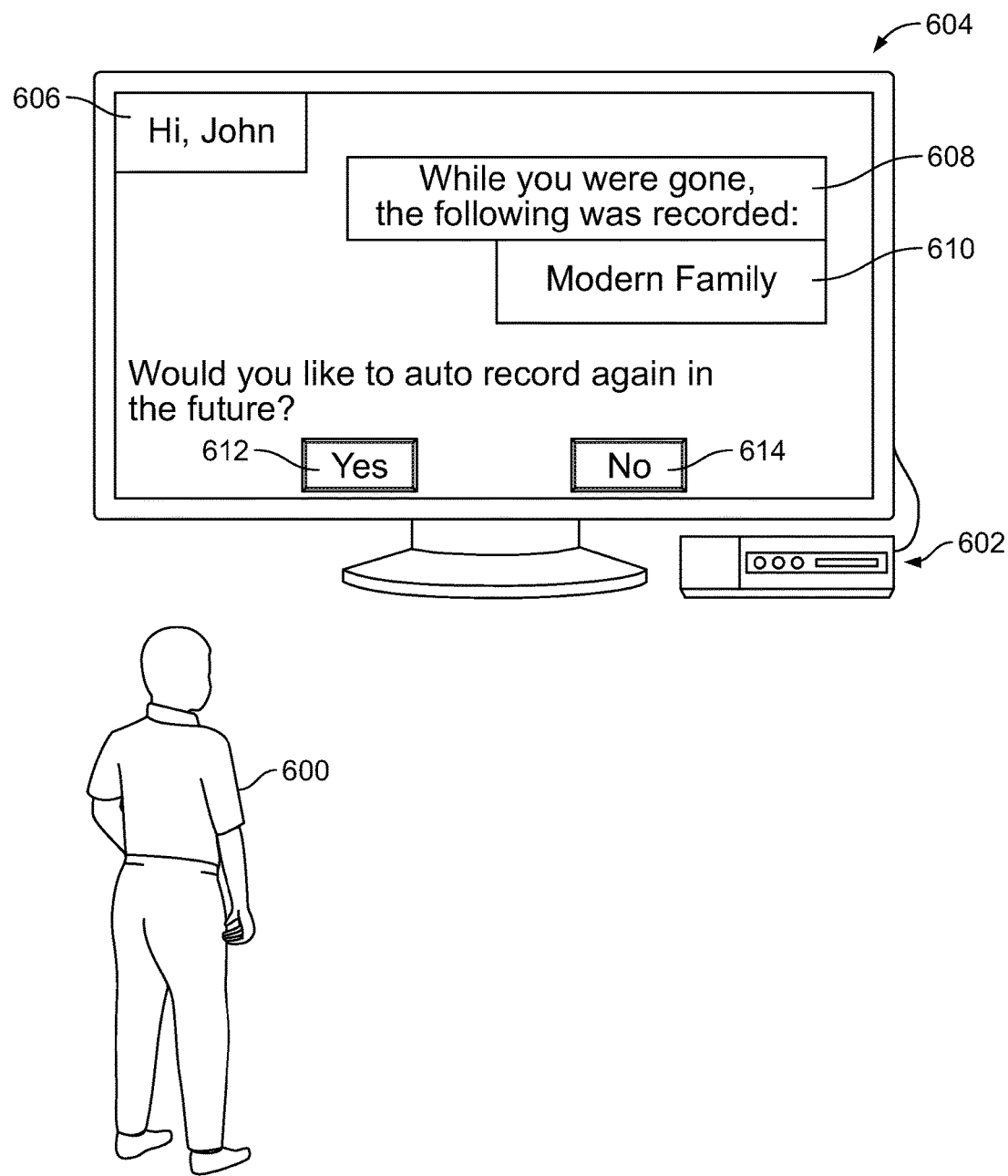
FIG. 6 shows an illustrative example of a user equipment device functioning as a user enters home in accordance with some embodiments of the disclosure.

FIG. 6 shows an illustrative example of a user equipment device functioning as a user enters home in accordance with some embodiments of the disclosure. For example, set-top box 602 executes a media guidance application which generates notification 608 for display on display 604. The media guidance application may also identify user 600 (e.g., via display of user identifier 606) who has returned home, which may be detected by a variety of devices and relayed to the media guidance application. Display 604 may appear on any of the user equipment devices listed in FIGS. 9-10 below. Moreover, the media guidance application may use one or more of the processes described in FIGS. 12-14 below to generate display 604 or any of the features described therein.

In some embodiments, the media guidance application determines that the user has returned home. For example, the media guidance application receives an indication from a smart lock that user 600 has returned home. The media guidance application may identify user 600 from other users from different passcodes used to unlock the smart lock. The smart lock may operate by transmitting a signal through a home network (e.g., a Wi-Fi local area network) to the media guidance application that a door has been unlocked and opened. Upon determining the user has returned home, the media guidance application determines, from a recording log stored in the functions database, whether the media asset was recorded in response to updating the entry for the media asset to include the recording function. For example, as described in FIGS. 1 and 5, the media guidance application recorded "Modern Family" even though it was scheduled as a reminder, not a recording, by the user. Thus, the media guidance application determines "Modern Family" was recorded in response to updating the entry for "Modern Family," an indication of which is stored in the recording log (e.g., as a Boolean value set to "true" if the function was changed to a recording). The recording log contains a list of all media assets that have been recorded and in some embodiments may include an indication of the user that scheduled each recording. The recording log may be an extension of the functions table (e.g., as described in FIGS. 1-5). The functions table may be designed in a self-referencing manner, where information about each user, his or her viewing histories, functions scheduled, and the recording log may all be linked via pointers to the appropriate fields in the table and stored in a non-contiguous manner. For example, the viewing history of a particular user may be in column 12, which is pointed to by an entry in a row for the user.

The media guidance application, in response to determining the media asset was recorded in response to updating the entry for the media asset to include the recording function, generates for display a notification that the media asset was recorded. For example, the media guidance application generates for display notification 608 that "While you were gone, the following was recorded." The media guidance application additionally generates an indication of which media asset, or media assets, were recorded (e.g., media asset 610). The notification optionally may include the first function associated with "Modern Family" (e.g., that a "reminder" was originally set.)

The media guidance application generates for display a selectable option to not record the media asset. For example, the media guidance application presents along with notification 608 that media asset 610 was recorded a selectable option 614, which may be labeled with text, "No, don't record." The media guidance application may additionally present a selectable option 612, which may be labeled with text, such as, "Yes, record again." The media guidance application, in response to receiving the selection, stores, in the database containing a plurality of media assets and associated functions, an instruction to not update the entry for the media asset to include the recording function during a next time the system determines the user is not at home. The database may contain a column that stores a Boolean value for whether to update the function to automatically record the media asset (e.g., media asset 610) of the associated row if user 600 is not at home. For example, upon receiving a selection of selectable option 614 for media asset 610, the media guidance application stores "False" in the automatic recording column for the row associated with media asset 610, as such, media asset 610 will not automatically be recorded when user 600 leaves home next time.

In some embodiments, the media guidance application retrieves, from the recording log, an indication of the user associated with the command. For example, the media guidance application stores an indication of which user (e.g., user identifier 606) of a particular user equipment device (e.g., set-top box 602) the recording was scheduled for. If user 600 added media asset 610 to a watch list and no other users have expressed interest in the media asset, the media guidance application may store in a particular field in the recording log in the row associated with media asset 610 an identifier of the father, such as a user name "John," (e.g., identifier 606). The media guidance application retrieves this string when the media guidance application receives an indication the user has returned home. The media guidance application then generates for display an identifier of the user and that the media asset was recorded in response to determining the user indicated interest in the media asset. For example, the media guidance application may generate for display that "Modern Family was recorded for user Dad1975" (e.g., identifier 606 on notification 608) when the father returns home.

FIG. 7 shows an illustrative example of a table where a function associated with a media asset is updated in accordance with some embodiments of the disclosure. For example, table 700 contains information about functions associated with media assets, as described in FIG. 4 above, and may contain priorities as described in FIG. 5 above. Table 700 additionally contains indication 708 of whether or not to record media asset 702, which may be user-specific (e.g., indication 708 applies to user 706). Table 700 may additionally include an indication of whether to display notification 712 that media asset 702 was automatically recorded, which may be user-specific (e.g., for all users 710). Table 700 may be stored in memory (e.g., storage as described in FIG. 10) on one or more user devices (e.g., any of the devices listed in FIGS. 10-11 below). Moreover, the media guidance application may use one or more of the processes described in FIGS. 12-14 below to generate table 700 or any of the features described therein.

In some embodiments, the media guidance application accesses the recording log stored in the functions database. For example, the media guidance application may access the functions database stored locally in memory or remotely (e.g., at a media guidance data source) via a communications network. The media guidance application generates for display an entry in the recording log including an identifier of the media asset, the associated function of the media asset, and an indication of whether to record the media asset. For example, the media guidance application may generate for display the entry for media asset 702, along with the associated first function (e.g., that it was originally scheduled as a reminder 704), and indication 708 of whether to record. The media guidance application may store different indications of whether to record for the same media asset (e.g., media asset 702) with different associated functions. For example, if the user scheduled a reminder, he or she may want the auto-recording feature enabled, but if the user added media asset 702 to a watch list, he or she may not want the auto-recording feature enabled. The media guidance application may store separate indications to record for each user of a particular user equipment device (e.g., indication 708 of whether to record for user 706, but a different indication for different users). The media guidance application may store an indication of whether to display the notification 712 that a particular media asset, which was originally not scheduled for recording, was recorded, as described above in FIG. 6. The media guidance application may store the indication of whether to display the notification 712 for each of the users of the user equipment device, or for all users 710.

The media guidance application receives a user selection to edit the entry. For example, the media guidance application may receive, via a user input interface (e.g., as described below in FIG. 10), a selection to edit the entry. The user may change any of the variable attributes of the recording log, such as whether to display notification 712, and indication 708 of whether or not to automatically record when the user is not at home. However, the media guidance application may not allow editing of certain attributes that are constant, like the title of the media asset (e.g., media asset 702). The media guidance application updates the entry in the recording log based on the user edits. For example, the media guidance application overwrites the fields in the entry that the user changed. For example, if the user edited the entry to reflect that automatic recording of media asset 702 should not occur when the user is not at home, the media guidance application may update a Boolean value for whether to automatically record media asset 702 to "False."

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view media assets, on-demand media assets (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 8:
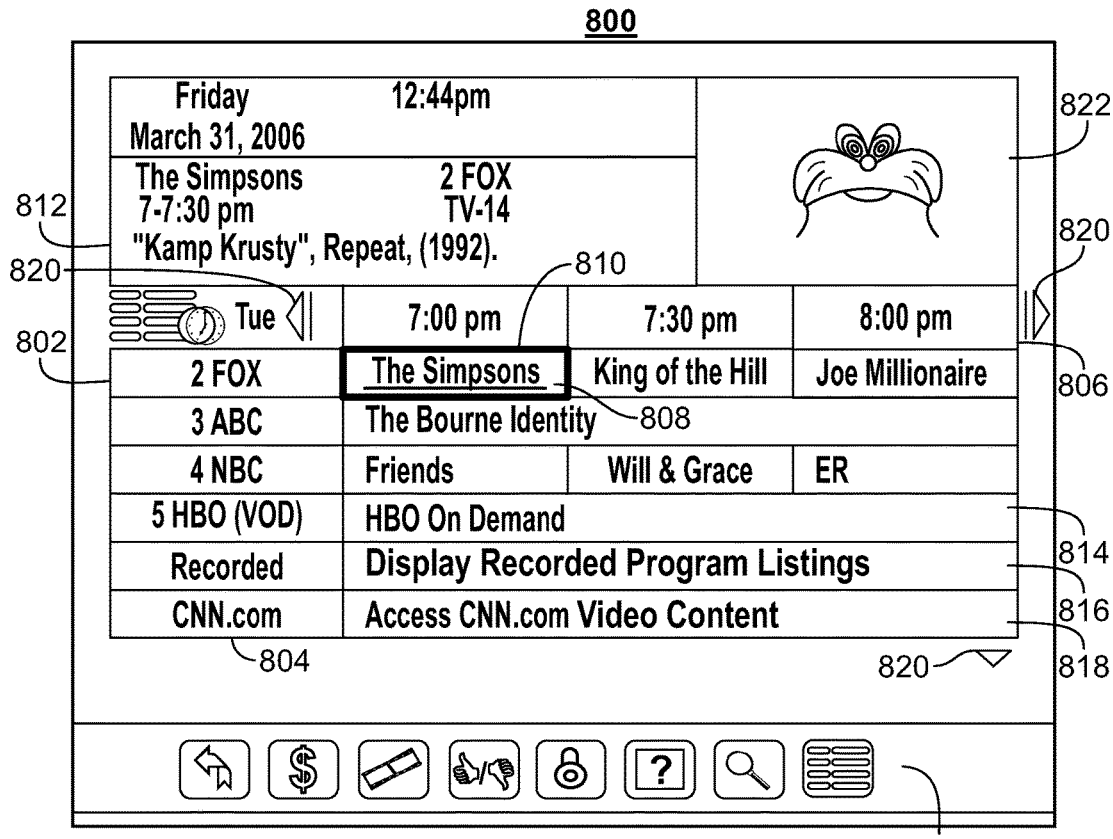
FIG. 8 shows an illustrative example of a display screen for use in accessing media content in accordance with some embodiments of the disclosure.
Figure 9:
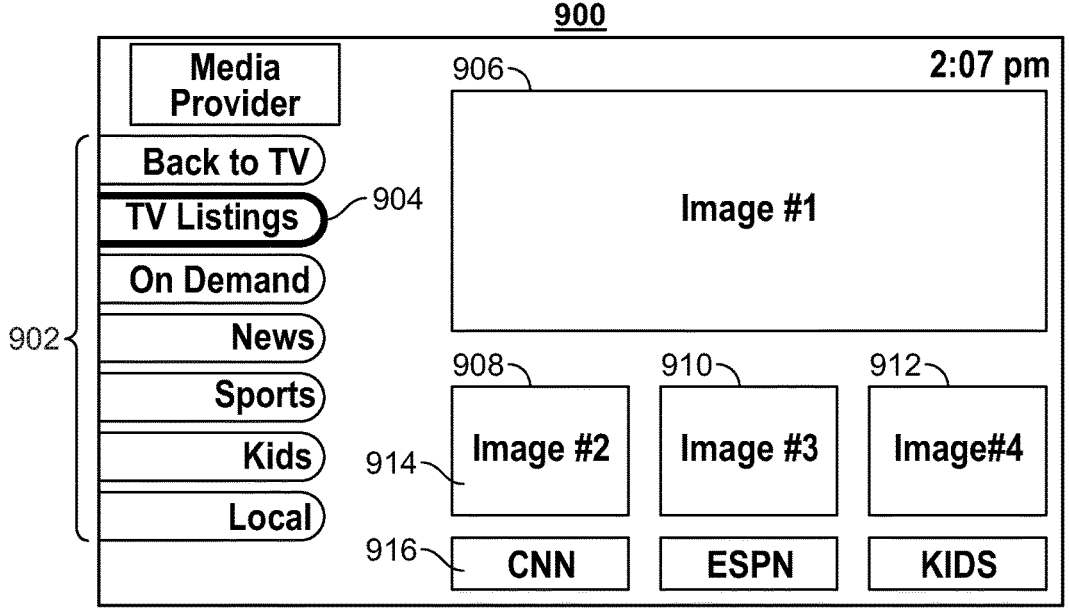
FIG. 9 shows another illustrative example of a display screen used access media content in accordance with some embodiments of the disclosure.

FIGS. 8-9 show illustrative display screens that may be used to provide media guidance data. The display screens shown in FIGS. 8-9 may be implemented on any suitable user equipment device or platform. While the displays of FIGS. 8-9 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 8 shows illustrative grid of a program listings display 800 arranged by time and channel that also enables access to different types of content in a single display. Display 800 may include grid 802 with: (1) a column of channel/content type identifiers 804, where each channel/content type identifier (which is a cell in the column) identifies a different channel or content type available; and (2) a row of time identifiers 806, where each time identifier (which is a cell in the row) identifies a time block of programming. Grid 802 also includes cells of program listings, such as program listing 808, where each listing provides the title of the program provided on the listing's associated channel and time. With a user input device, a user can select program listings by moving highlight region 810. Information relating to the program listing selected by highlight region 810 may be provided in program information region 812. Region 812 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 802 may provide media guidance data for non-linear programming including on-demand listing 814, recorded content listing 816, and Internet content listing 818. A display combining media guidance data for content from different types of content sources is sometimes referred to as a "mixed-media" display. Various permutations of the types of media guidance data that may be displayed that are different than display 800 may be based on user selection or guidance application definition (e.g., a display of only recorded and broadcast listings, only on-demand and broadcast listings, etc.). As illustrated, listings 814, 816, and 818 are shown as spanning the entire time block displayed in grid 802 to indicate that selection of these listings may provide access to a display dedicated to on-demand listings, recorded listings, or Internet listings, respectively. In some embodiments, listings for these content types may be included directly in grid 802. Additional media guidance data may be displayed in response to the user selecting one of the navigational icons 820. (Pressing an arrow key on a user input device may affect the display in a similar manner as selecting navigational icons 820.)

Display 800 may also include video region 822, and options region 826. Video region 822 may allow the user to view and/or preview media assets that are currently available, will be available, or were available to the user. The content of video region 822 may correspond to, or be independent from, one of the listings displayed in grid 802. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 826 may allow the user to access different types of content, media guidance application displays, and/or media guidance application features. Options region 826 may be part of display 800 (and other display screens described herein), or may be invoked by a user by selecting an on-screen option or pressing a dedicated or assignable button on a user input device. The selectable options within options region 826 may concern features related to program listings in grid 802 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 11. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 9. Video mosaic display 900 includes selectable options 902 for content information organized based on content type, genre, and/or other organization criteria. In display 900, television listings option 904 is selected, thus providing listings 906, 908, 910, and 912 as broadcast program listings. In display 900 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 908 may include more than one portion, including media portion 914 and text portion 916. Media portion 914 and/or text portion 916 may be selectable to view content in full-screen or to view information related to the content displayed in media portion 914 (e.g., to view listings for the channel that the video is displayed on).

The listings in display 900 are of different sizes (i.e., listing 906 is larger than listings 908, 910, and 912), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 10:
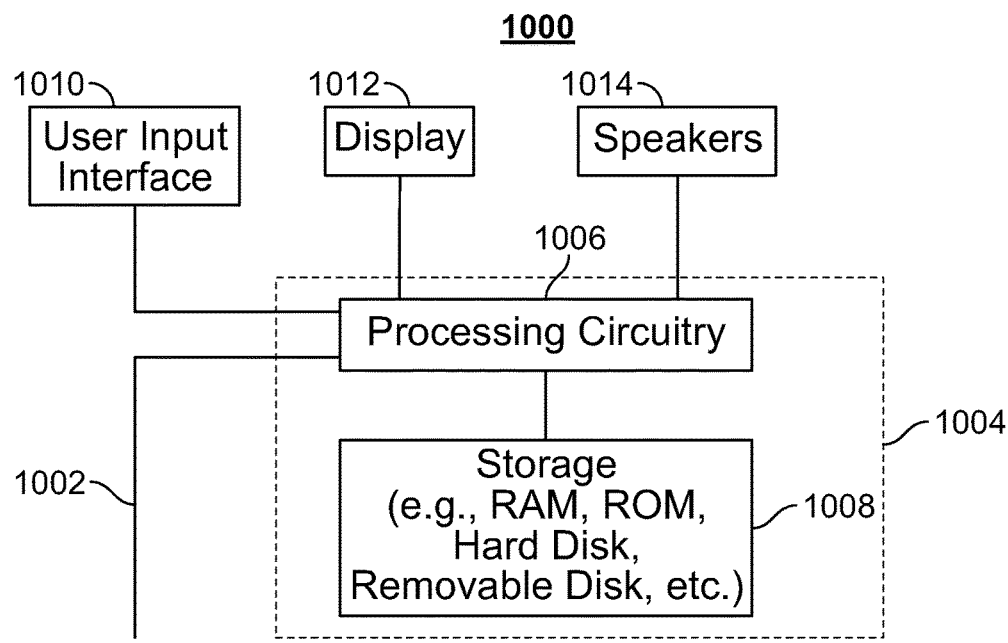
FIG. 10 is a block diagram of an illustrative user equipment device in accordance with some embodiments of the disclosure.

Users may access content and the media guidance application (and its display screens described above and below) from one or more of their user equipment devices. FIG. 10 shows a generalized embodiment of illustrative user equipment device 1000. More specific implementations of user equipment devices are discussed below in connection with FIG. 11. User equipment device 1000 may receive content and data via input/output (hereinafter "I/O") path 1002. I/O path 1002 may provide content (e.g., broadcast programming, on-demand programming, Internet content, content available over a local area network (LAN) or wide area network (WAN), and/or other content) and data to control circuitry 1004, which includes processing circuitry 1006 and storage 1008. Control circuitry 1004 may be used to send and receive commands, requests, and other suitable data using I/O path 1002. I/O path 1002 may connect control circuitry 1004 (and specifically processing circuitry 1006) to one or more communications paths (described below). I/O functions may be provided by one or more of these communications paths, but are shown as a single path in FIG. 10 to avoid overcomplicating the drawing.

Control circuitry 1004 may be based on any suitable processing circuitry such as processing circuitry 1006. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1004 executes instructions for a media guidance application stored in memory (i.e., storage 1008). Specifically, control circuitry 1004 may be instructed by the media guidance application to perform the functions discussed above and below. For example, the media guidance application may provide instructions to control circuitry 1004 to generate the media guidance displays. In some implementations, any action performed by control circuitry 1004 may be based on instructions received from the media guidance application.

In client-server based embodiments, control circuitry 1004 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 11). In addition, communications circuitry may include circuitry that enables peer-to-peer communication of user equipment devices, or communication of user equipment devices in locations remote from each other (described in more detail below).

Memory may be an electronic storage device provided as storage 1008 that is part of control circuitry 1004. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 1008 may be used to store various types of content described herein as well as media guidance data described above. Nonvolatile memory may also be used (e.g., to launch a boot-up routine and other instructions). Cloud-based storage, described in relation to FIG. 11, may be used to supplement storage 1008 or instead of storage 1008.

Control circuitry 1004 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 1004 may also include scaler circuitry for upconverting and downconverting content into the preferred output format of the user equipment 1000. Circuitry 1004 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 1008 is provided as a separate device from user equipment 1000, the tuning and encoding circuitry (including multiple tuners) may be associated with storage 1008.

A user may send instructions to control circuitry 1004 using user input interface 1010. User input interface 1010 may be any suitable user interface, such as a remote control, mouse, trackball, keypad, keyboard, touch screen, touchpad, stylus input, joystick, voice recognition interface, or other user input interfaces. Display 1012 may be provided as a stand-alone device or integrated with other elements of user equipment device 1000. For example, display 1012 may be a touchscreen or touch-sensitive display. In such circumstances, user input interface 1010 may be integrated with or combined with display 1012. Display 1012 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 1012 may be HDTV-capable. In some embodiments, display 1012 may be a 3D display, and the interactive media guidance application and any suitable content may be displayed in 3D. A video card or graphics card may generate the output to the display 1012. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 1004. The video card may be integrated with the control circuitry 1004. Speakers 1014 may be provided as integrated with other elements of user equipment device 1000 or may be stand-alone units. The audio component of videos and other content displayed on display 1012 may be played through speakers 1014. In some embodiments, the audio may be distributed to a receiver (not shown), which processes and outputs the audio via speakers 1014.

The guidance application may be implemented using any suitable architecture. For example, it may be a stand-alone application wholly-implemented on user equipment device 1000. In such an approach, instructions of the application are stored locally (e.g., in storage 1008), and data for use by the application is downloaded on a periodic basis (e.g., from an out-of-band feed, from an Internet resource, or using another suitable approach). Control circuitry 1004 may retrieve instructions of the application from storage 1008 and process the instructions to generate any of the displays discussed herein. Based on the processed instructions, control circuitry 1004 may determine what action to perform when input is received from input interface 1010. For example, movement of a cursor on a display up/down may be indicated by the processed instructions when input interface 1010 indicates that an up/down button was selected.

In some embodiments, the media guidance application is a client-server based application. Data for use by a thick or thin client implemented on user equipment device 1000 is retrieved on-demand by issuing requests to a server remote to the user equipment device 1000. In one example of a client-server based guidance application, control circuitry 1004 runs a web browser that interprets web pages provided by a remote server. For example, the remote server may store the instructions for the application in a storage device. The remote server may process the stored instructions using circuitry (e.g., control circuitry 1004) and generate the displays discussed above and below. The client device may receive the displays generated by the remote server and may display the content of the displays locally on equipment device 1000. This way, the processing of the instructions is performed remotely by the server while the resulting displays are provided locally on equipment device 1000. Equipment device 1000 may receive inputs from the user via input interface 1010 and transmit those inputs to the remote server for processing and generating the corresponding displays. For example, equipment device 1000 may transmit a communication to the remote server indicating that an up/down button was selected via input interface 1010. The remote server may process instructions in accordance with that input and generate a display of the application corresponding to the input (e.g., a display that moves a cursor up/down). The generated display is then transmitted to equipment device 1000 for presentation to the user.

In some embodiments, the media guidance application is downloaded and interpreted or otherwise run by an interpreter or virtual machine (run by control circuitry 1004). In some embodiments, the guidance application may be encoded in the ETV Binary Interchange Format (EBIF), received by control circuitry 1004 as part of a suitable feed, and interpreted by a user agent running on control circuitry 1004. For example, the guidance application may be an EBIF application. In some embodiments, the guidance application may be defined by a series of JAVA-based files that are received and run by a local virtual machine or other suitable middleware executed by control circuitry 1004. In some of such embodiments (e.g., those employing MPEG-2 or other digital media encoding schemes), the guidance application may be, for example, encoded and transmitted in an MPEG-2 object carousel with the MPEG audio and video packets of a program.

Figure 11:
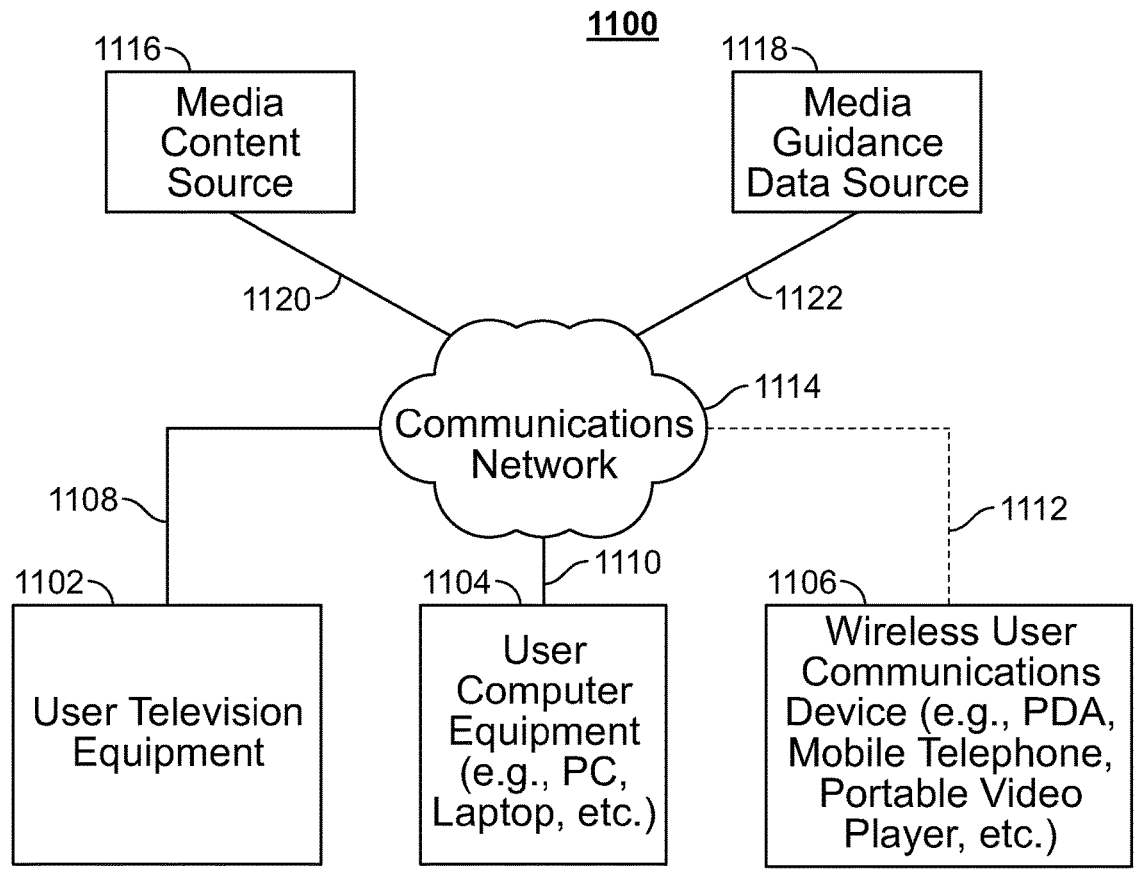
FIG. 11 is a block diagram of an illustrative media system in accordance with some embodiments of the disclosure.

User equipment device 1000 of FIG. 10 can be implemented in system 1100 of FIG. 11 as user television equipment 1102, user computer equipment 1104, wireless user communications device 1106, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 10 may not be classified solely as user television equipment 1102, user computer equipment 1104, or a wireless user communications device 1106. For example, user television equipment 1102 may, like some user computer equipment 1104, be Internet-enabled allowing for access to Internet content, while user computer equipment 1104 may, like some television equipment 1102, include a tuner allowing for access to television programming. The media guidance application may have the same layout on various different types of user equipment or may be tailored to the display capabilities of the user equipment. For example, on user computer equipment 1104, the guidance application may be provided as a web site accessed by a web browser. In another example, the guidance application may be scaled down for wireless user communications devices 1106.

In system 1100, there is typically more than one of each type of user equipment device but only one of each is shown in FIG. 11 to avoid overcomplicating the drawing. In addition, each user may utilize more than one type of user equipment device and also more than one of each type of user equipment device.

In some embodiments, a user equipment device (e.g., user television equipment 1102, user computer equipment 1104, wireless user communications device 1106) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 1114. Namely, user television equipment 1102, user computer equipment 1104, and wireless user communications device 1106 are coupled to communications network 1114 via communications paths 1108, 1110, and 1112, respectively. Communications network 1114 may be one or more networks including the Internet, a mobile phone network, mobile voice or data network (e.g., a 4G or LTE network), cable network, public switched telephone network, or other types of communications network or combinations of communications networks. Paths 1108, 1110, and 1112 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 1112 is drawn with dotted lines to indicate that in the exemplary embodiment shown in FIG. 11 it is a wireless path and paths 1108 and 1110 are drawn as solid lines to indicate they are wired paths (although these paths may be wireless paths, if desired). Communications with the user equipment devices may be provided by one or more of these communications paths, but are shown as a single path in FIG. 11 to avoid overcomplicating the drawing.

Although communications paths are not drawn between user equipment devices, these devices may communicate directly with each other via communication paths, such as those described above in connection with paths 1108, 1110, and 1112, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 1114.

System 1100 includes content source 1116 and media guidance data source 1118 coupled to communications network 1114 via communication paths 1120 and 1122, respectively. Paths 1120 and 1122 may include any of the communication paths described above in connection with paths 1108, 1110, and 1112. Communications with the content source 1116 and media guidance data source 1118 may be exchanged over one or more communications paths, but are shown as a single path in FIG. 11 to avoid overcomplicating the drawing. In addition, there may be more than one of each of content source 1116 and media guidance data source 1118, but only one of each is shown in FIG. 11 to avoid overcomplicating the drawing. (The different types of each of these sources are discussed below.) If desired, content source 1116 and media guidance data source 1118 may be integrated as one source device. Although communications between sources 1116 and 1118 with user equipment devices 1102, 1104, and 1106 are shown as through communications network 1114, in some embodiments, sources 1116 and 1118 may communicate directly with user equipment devices 1102, 1104, and 1106 via communication paths (not shown) such as those described above in connection with paths 1108, 1110, and 1112.

Content source 1116 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 1116 may be the originator of content (e.g., a television broadcaster, a Webcast provider, etc.) or may not be the originator of content (e.g., an on-demand content provider, an Internet provider of content of broadcast media assets for downloading, etc.). Content source 1116 may include cable sources, satellite providers, on-demand providers, Internet providers, over-the-top content providers, or other providers of content. Content source 1116 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 1118 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 1118 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 1118 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 1118 may provide user equipment devices 1102, 1104, and 1106 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 1008, and executed by control circuitry 1004 of a user equipment device 1000. In some embodiments, media guidance applications may be client-server applications where only a client application resides on the user equipment device, and server application resides on a remote server. For example, media guidance applications may be implemented partially as a client application on control circuitry 1004 of user equipment device 1000 and partially on a remote server as a server application (e.g., media guidance data source 1118) running on control circuitry of the remote server. When executed by control circuitry of the remote server (such as media guidance data source 1118), the media guidance application may instruct the control circuitry to generate the guidance application displays and transmit the generated displays to the user equipment devices. The server application may instruct the control circuitry of the media guidance data source 1118 to transmit data for storage on the user equipment. The client application may instruct control circuitry of the receiving user equipment to generate the guidance application displays.

Content and/or media guidance data delivered to user equipment devices 1102, 1104, and 1106 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 1100 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 11.

In one approach, user equipment devices may communicate with each other within a home network. User equipment devices can communicate with each other directly via short-range point-to-point communication schemes described above, via indirect paths through a hub or other similar device provided on a home network, or via communications network 1114. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 1116 to access content. Specifically, within a home, users of user television equipment 1102 and user computer equipment 1104 may access the media guidance application to navigate among and locate desirable content. Users may also access the media guidance application outside of the home using wireless user communications devices 1106 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 1114. These cloud resources may include one or more content sources 1116 and one or more media guidance data sources 1118. In addition or in the alternative, the remote computing sites may include other user equipment devices, such as user television equipment 1102, user computer equipment 1104, and wireless user communications device 1106. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 1104 or wireless user communications device 1106 having content capture feature. Alternatively, the user can first transfer the content to a user equipment device, such as user computer equipment 1104. The user equipment device storing the content uploads the content to the cloud using a data transmission service on communications network 1114. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 10.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 12:
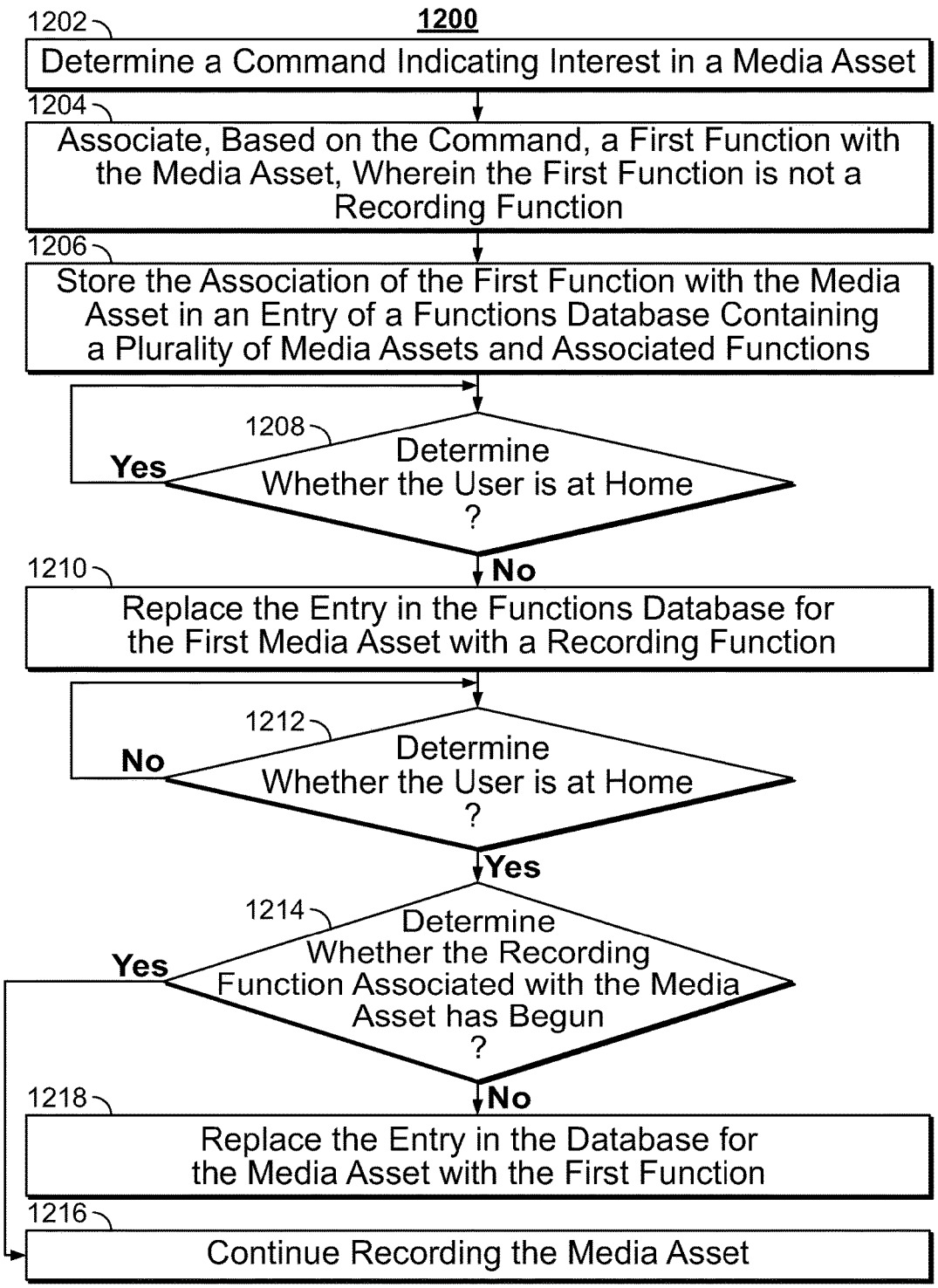
FIG. 12 is a flowchart of illustrative steps for automatically recording media assets not explicitly scheduled for recording by a user in accordance with some embodiments of the disclosure.

FIG. 12 is a flowchart of illustrative steps for automatically recording media assets not explicitly scheduled for recording by a user in accordance with some embodiments of the disclosure. For example, a media guidance application implementing process 1200 may be executed by control circuitry 1004 (FIG. 10).

Process 1200 begins at 1202, where control circuitry 1004 determines a command indicating interest in a media asset. For example, control circuitry 1004 may determine that the user (e.g., user 106) has expressed interest in a particular media asset, e.g., "Modern Family," but has not explicitly scheduled the media asset for recording based on accessing an entry for the media asset stored in the functions database (e.g., as described in FIG. 1-7). Control circuitry 1004 determines whether an activity of the user (e.g., user 106), such as scheduling a reminder, adding a media asset to a watch list or favorites list, or posting on social media about the program, constitutes the command expressing interest, as described further in FIGS. 1-2 and 13. In response to determining the user has expressed interest in the media asset, control circuitry 1004 determines the activity of the user is the command indicating interest in the media asset. For example, since the user (e.g., user 106) scheduled a reminder for "Modern Family," control circuitry 1004 determines this constitutes the command indicating interest in the media asset "Modern Family."

Process 1200 continues to 1204, where control circuitry 1004 associates, based on the command, a first function with the media asset, wherein the first function is not a recording function. The first function may be any scheduled alert or indication of general interest in a media asset, such as a reminder message for an episode or series, an entry of a watch list, an entry of a favorite program list, or an entry of a general interest list in a user profile. For example, in response to the user (e.g., user 106) selecting an option to create a reminder message for the media asset, "Modern Family," control circuitry 1004 associates a reminder function with that media asset. As another example, in response to the user (e.g., user 106) adding a media asset to a watch list, control circuitry 1004 creates an entry for the media asset on the watch list, which may be stored in a separate database referenced by the functions database or contained in the functions database. For instance, control circuitry 1004 may associate the first function with the media asset by generating a reference (e.g., a pointer) to a reminder function for the media asset. The reference, which is contained in the functions database, may contain parameters to be passed to the reminder function, such as the time the reminder function should run for the media asset.

Process 1200 continues to 1206, where control circuitry 1004 stores the association of the first function with the media asset in an entry of a functions database containing a plurality of media assets and associated functions. For example, the functions database may be organized in any suitable data structure, such as a table (e.g., table 400). In the example where the functions database is organized as a table (e.g., table 400), which may be self-referencing or relational, each row contains a different media asset (e.g., media asset 416) and an associated function (e.g., reminder 414). Table 400 contains information such as times (e.g., times 406), channels (e.g., channels 410), and additional information (e.g., additional information 412). The functions database may be stored either locally in memory (e.g., storage 908), or remotely at a media guidance data source (e.g., media guidance data source 1018) accessible via a communications network (e.g., communications network 1014), as described further in FIGS. 9-10). As an example, control circuitry 1004 stores an entry (e.g., creates a new row in table 400) containing the (e.g., media asset 416) and the first function (e.g., reminder 414), when a command is determined as described above in FIGS. 1-3, 11, and 12.

Process 1200 continues to 1208, where control circuitry 1004 determines whether the user is at home. For example, control circuitry 1004 determines whether the user has left home by monitoring a smart lock, RFID chip in the user's mobile phone, or other methods, as described further below in FIG. 14. If control circuitry 1004 determines the user is still at home, process 1200 returns to 1208 and continues to monitor whether the user has left home.

If control circuitry 1004 determines the user has left home, process 1200 continues to 1210, where control circuitry 1004 replaces the entry in the functions database for the first media asset with a recording function. For example, when the media guidance application determines the user is not at home, control circuitry 1004 replaces the function (e.g., reminder 414) with a recording function (e.g., record 418) for the media asset (e.g., media asset 416).

Process 1200 continues to 1212, where control circuitry 1004 determines whether the user is at home. For example, control circuitry 1004 determines whether the user has returned home by monitoring a smart lock, RFID chip in the user's mobile phone, or other methods, as described further below in FIG. 14. If control circuitry 1004 determines the user has not returned home, process 1200 returns to 1212 and continues to monitor whether the user has returned home.

If control circuitry 1004 determines the user has returned home, process 1200 continues to 1214, where control circuitry 1004 determines whether the recording function associated with the media asset has begun. For example, control circuitry 1004 may retrieve a status indicator from the functions table indicating whether the particular function is scheduled or currently being performed.

If control circuitry determines the recording function has begun, process 1200 continues to 1216, where control circuitry 1004 continues to record the media asset. For example, control circuitry 1004 may determine that since the media asset "Modern Family" begins at 7:00 pm, but the user (e.g., user 106) returned to his or her home (e.g., home 108) at 7:45 pm, the recording of the media asset "Modern Family" has begun, as indicated by the status indicator from the functions table. In this case, control circuitry 1004 would continue to record "Modern Family," since the recording has already begun.

If control circuitry determines the recording function has not yet begun, process 1200 continues to 1218, where control circuitry 1004 replaces the entry in the database for the media asset with the first function. For example, control circuitry 1004 may determine that since the media asset "Modern Family" begins at 7:00 pm, but the user (e.g., user 106) returned to his or her home (e.g., home 108) at 6:45 pm, the recording of the media asset "Modern Family" has not yet begun, as indicated by the status indicator from the functions table. In this case, control circuitry 1004 would replace the record function with the first function that was originally scheduled by the user (e.g., user 106).

Figure 13:
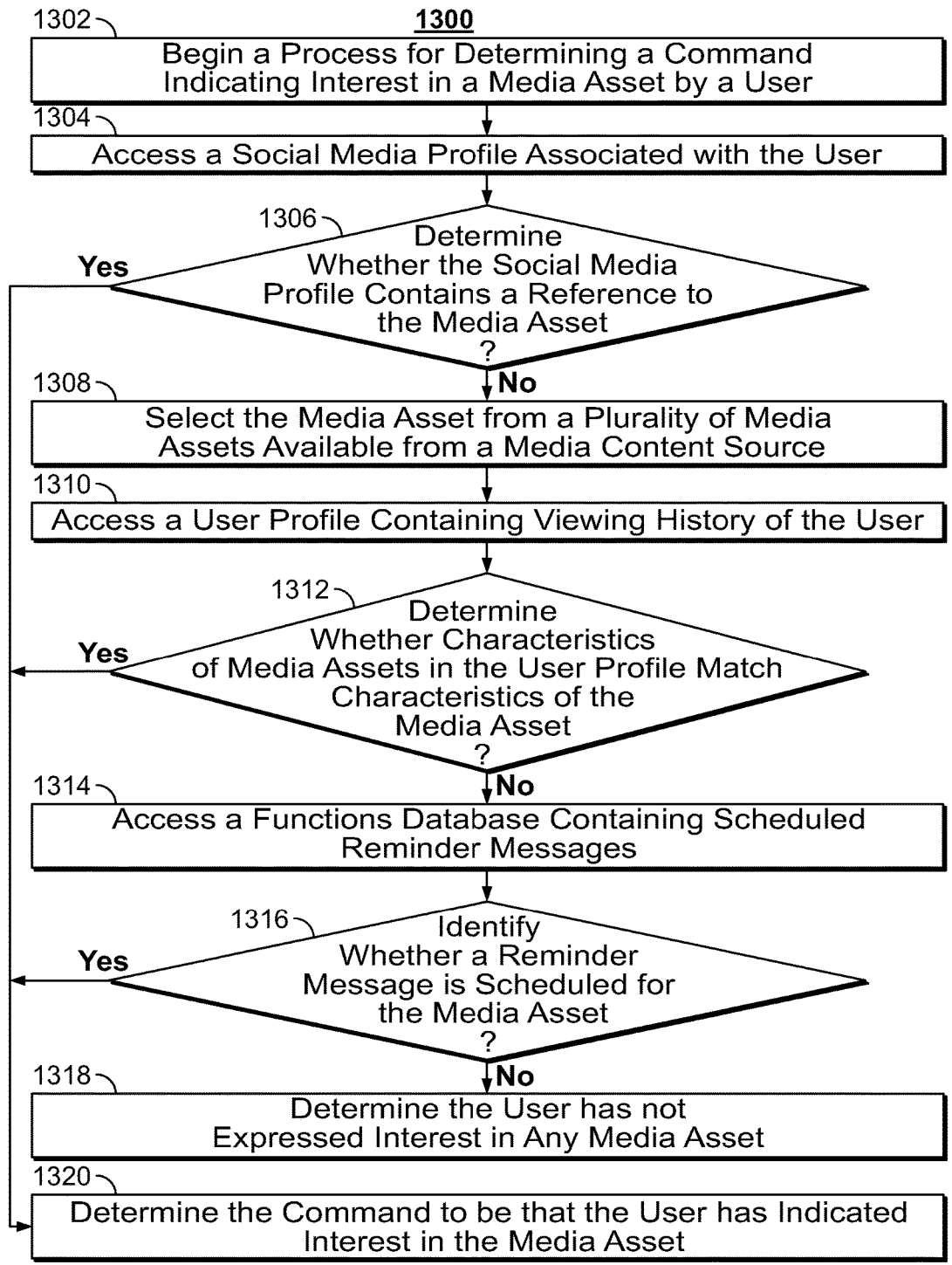
FIG. 13 is a flowchart of illustrative steps for determining user interest in a media asset in accordance with some embodiments of the disclosure.

FIG. 13 is a flowchart of illustrative steps for determining user interest in a media asset in accordance with some embodiments of the disclosure. For example, a media guidance application implementing process 1300 may be executed by control circuitry 1004 (FIG. 10). Process 1300 may be executed multiple times to determine multiple media assets for which the user indicated interest to ensure that all media assets the user is interested in are recorded by the system, if possible (e.g., hardware limitations as described in FIG. 5).

Process 1300 begins with 1302, where control circuitry 1004 begins a process for determining a command indicating interest in a media asset by a user. For example, control circuitry 1004 determines whether an activity of the user, such as scheduling a reminder, adding a media asset to a watch list or favorites list, or posting on social media about the media asset, constitutes the command expressing interest.

Process 1300 continues to 1304, where control circuitry 1004 accesses a social media profile associated with the user. For example, control circuitry 1004 may access a profile of the user (e.g., user 302) on a website (e.g., social media page 300).

Process 1300 continues to 1306, where control circuitry 1004 determines whether the social media profile contains a reference to the media asset. As described above in FIG. 3, control circuitry 1004 determines that the retrieved information includes a reference to the media asset. If control circuitry 1004 determines the social media profile contains a reference to the media asset, process 1300 continues to 1320, where control circuitry 1004 determines the command to be that the user has indicated interest in the media asset.

For example, based on comparing the text of a retrieved post (e.g., post 304) from the social media profile with identifiers of media assets retrieved from a media guidance data source, control circuitry 1004 determines "The Flash" is a reference to the series "The Flash." Control circuitry 1004 determines the expressed interest (e.g., post 304) constitutes expressed interest from the user and stores the command in the functions database, as described further in FIGS. 1-7.

If control circuitry 1004 determines the social media profile contains a reference to the media asset, process 1300 continues to 1308, where control circuitry 1004 selects the media asset from a plurality of media assets available from a media content source. For example, the media guidance application may retrieve information for an upcoming media asset before or during the time the user is not at home.

Process 1300 continues to 1310, where control circuitry 1004 accesses a user profile containing viewing history of the user. For example, a plurality of user profiles may be stored, each with its own functions database (e.g., a relational model), or there may be a central master functions database with a column identifying which user is associated with scheduling a particular function for a media asset, which could be configured in a non-contiguous table (e.g., a self-referencing table or data structure). The user profiles may be stored either locally in memory (e.g., storage 908), or remotely at a media guidance data source (e.g., media guidance data source 1018) accessible via a communications network (e.g., communications network 1014), as described further in FIGS. 9-10).

Process 1300 continues to 1312, where control circuitry 1004 determines whether characteristics of media assets in the user profile match characteristics of the media asset. For example, control circuitry 1004 retrieves the media asset, "The Middle" from the user profile for the user, which has the associated characteristics (e.g., keywords), "family" and "situational comedy." Control circuitry 1004 determines whether a first characteristic associated with the plurality of media assets is also associated with the media asset. For example, control circuitry 1004 compares the characteristics of media assets the user has already watched (e.g., "The Middle") with those that he might miss by being away from home selected in step 1310, for example, the media asset, "Modem Family."

If control circuitry 1004 determines the characteristics of media assets in the user profile match characteristics of the media asset, process 1300 continues to 1320, where control circuitry 1004 determines the command to be that the user has indicated interest in the media asset. For example, since the user viewed media assets with similar keywords to the media asset selected, control circuitry 1004 determines that the characteristics correspond. Control circuitry 1004 determines that the expressed interest (e.g., the viewing history) constitutes expressed interest from the user and stores the command in the functions database, as described further in FIGS. 1-7.

If control circuitry 1004 determines the characteristics of media assets in the user profile do not match characteristics of the media asset, process 1300 continues to 1314, where control circuitry 1004 accesses a functions database containing scheduled reminder messages. For example, the functions database may be stored for each of a plurality of users (e.g., a relational model) or there may be a central master functions database with a column identifying which user is associated with scheduling a particular function for a media asset, which could be configured in a non-contiguous table (e.g., a self-referencing table or data structure). The user profiles may be stored either locally in memory (e.g., storage 908), or remotely at a media guidance data source (e.g., media guidance data source 1018) accessible via a communications network (e.g., communications network 1014), as described further in FIGS. 9-10).

Process 1300 continues to 1316, where control circuitry 1004 identifies a reminder message scheduled for the media asset. For example, control circuitry 1004 determines whether any reminders are scheduled, and if so, for which media assets by querying the functions database by executing a database query language script, such as SQL, and utilizing the declarative "Select" command to access data in a particular expression.

If control circuitry 1004 determines that a reminder message was scheduled for the media asset, process 1300 continues to 1320, where control circuitry 1004 determines the command to be that the user has indicated interest in the media asset. For example, since the user scheduled a reminder for the media asset, control circuitry 1004 determines the user expressed interest (e.g., since he or she scheduled a reminder) and stores the command in the functions database, as described further in FIGS. 1-7.

If control circuitry 1004 determines that a reminder message was not scheduled for the media asset, process 1300 continues to 1318, where control circuitry 1004 determines the user has not expressed interest in any media asset. For example, if control circuitry 1004 does not determine any media assets that the user has expressed interest in, there are no media assets to replace the first function with a recording function.

Figure 14:
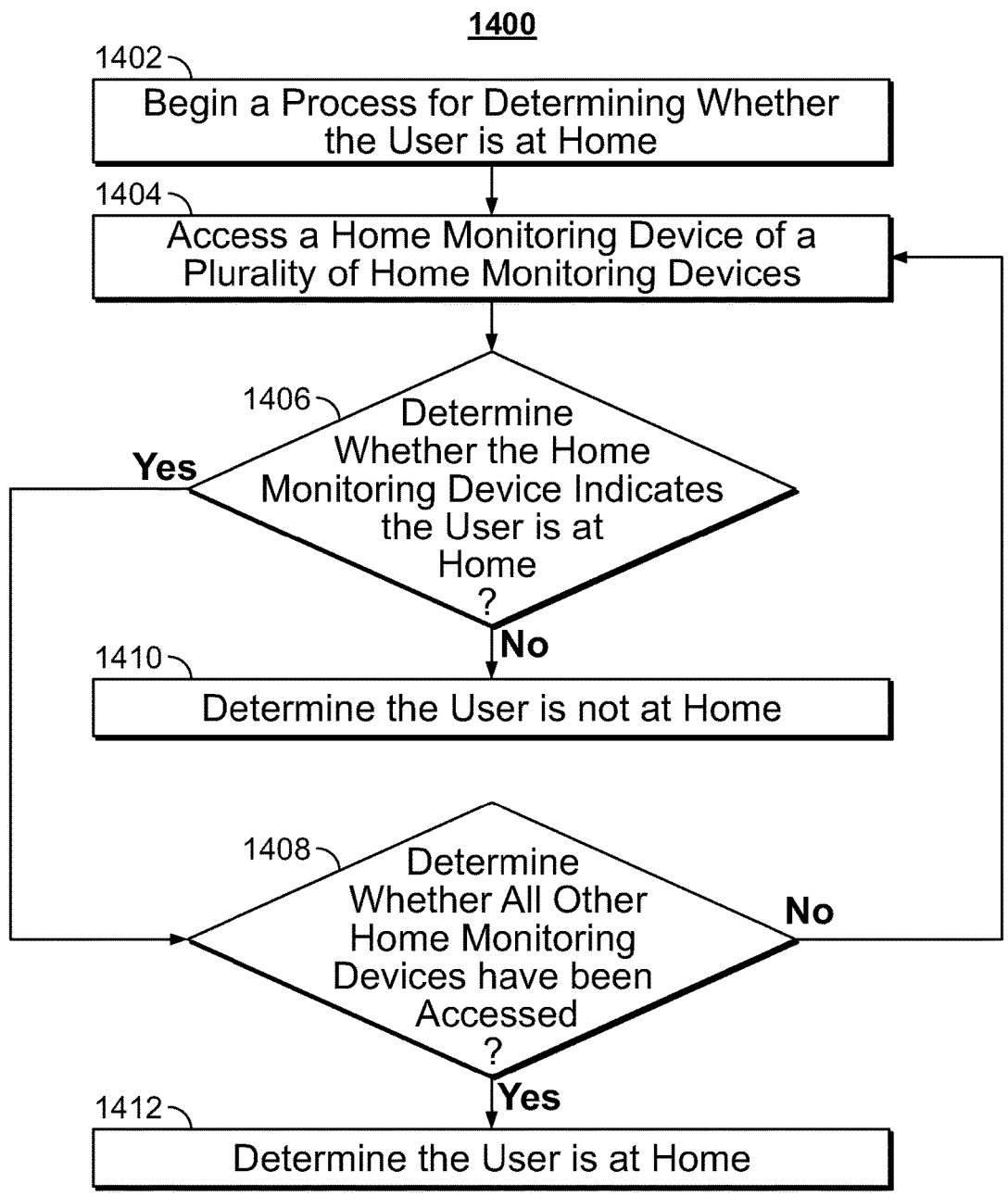
FIG. 14 is a flowchart of illustrative steps for determining whether a user is at home in accordance with some embodiments of the disclosure.

FIG. 14 is a flowchart of illustrative steps for determining whether a user is at home in accordance with some embodiments of the disclosure. For example, a media guidance application implementing process 1400 may be executed by control circuitry 1004 (FIG. 10).

Process 1400 begins with 1402, where control circuitry 1004 begins a process for determining whether the user is at home. For example, control circuitry 1004 may query a plurality of home monitoring devices for status information relating to whether a user entered or exited a home.

Process 1400 continues to 1404, where control circuitry 1004 accesses a home monitoring device of a plurality of home monitoring devices. A home monitoring device may be a smart lock, a security camera, an RFID chip reader that scans an RFID chip embedded in a user device of a user, or any other home monitoring devices known in the art. Control circuitry 1004 accesses the home monitoring devices by transmitting a packet (e.g., through a Wi-Fi local area network) to one of the home monitoring devices, which authenticates the identity (e.g., via a secure passcode) of control circuitry 1004 of the user equipment device (e.g., any of the user equipment devices described in FIG. 10). The packet may additionally contain parameters governing the communication with the home monitoring device (e.g., a digital handshake).

Process 1400 continues to 1406, where control circuitry 1004 determines whether the home monitoring device indicates the user is at home. For example, control circuitry 1004 transmits a packet to the home monitoring device querying the home monitoring device for status information. Control circuitry 1004 may retrieve status information from the home monitoring device and determine whether the information indicates the user is at home. For example, the retrieved information may include Boolean values for each user residing in the house about whether they are currently in the house or not.

If control circuitry 1004 determines the home monitoring device indicates the user is not at home, process 1400 continues to 1410, where control circuitry 1004 determines the user is not at home. For example, if one home monitoring device indicates the user is not at home, control circuitry 1004 determines the user is not at home. In some embodiments, multiple home monitoring devices need to indicate that the user is not at home for control circuitry 1004 to determine the user is not at home. In still other embodiments, all home monitoring devices need to indicate that the user is not at home for control circuitry 1004 to determine the user is not at home.

If control circuitry 1004 determines the home monitoring device indicates the user is at home, process 1400 continues to 1408, where control circuitry 1004 determines whether all other home monitoring devices have been accessed. For example, control circuitry 1004 may access a list of home monitoring devices stored in memory (e.g., storage as described in FIG. 10) on one or more user devices (e.g., any of the devices listed in FIGS. 10-11 below). Control circuitry 1004 may determine that not all home monitoring devices have been accessed by storing an indication (e.g., a Boolean set to "true") when each is accessed.

If control circuitry 1004 determines not all other home monitoring devices have been accessed, process 1400 returns to 1404, where control circuitry 1004 accesses a home monitoring device of a plurality of home monitoring devices. For example, control circuitry 1004 continues to access and query home monitoring devices for status information relating to the presence or absence of the user in the home until all home monitoring devices have been queried.

If control circuitry 1004 determines all other home monitoring devices have been accessed, process 1400 continues to 1412, where control circuitry 1004 determines the user is at home. For example, every home monitoring device must indicate the user is home in order for control circuitry 1004 to determine the user is home. In the alternate embodiments described above in step 1410, control circuitry 1004 does not need to determine that every home monitoring device indicates the user is at home in order to determine the user is at home.

It is contemplated that the steps or descriptions of each of FIGS. 12-14 may be used with any other embodiment of this disclosure. In addition, the steps and descriptions described in relation to FIGS. 12-14 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-11 could be used to perform one or more of the steps in FIGS. 12-14.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for automatically recording media assets not explicitly scheduled for recording by a user, the method comprising:
   accessing a social media profile associated with the user;
   retrieving information relating to a social media activity performed by the user from the social media profile;
   retrieving, from a media asset database, identifying information of one or more media assets;
   comparing the retrieved information relating to the social media activity with the identifying information of the one or more media assets;
   determining, based on the comparing, that the user has indicated
   a reference identifying a media asset in the social media activity;
   determining, from a context of the social media activity, that the reference constitutes a command indicating interest in the media asset;
   associating, based on the command of interest determined from the context of the social media activity, a first function with the media asset, wherein the first function is not a recording function;
   storing the association of the first function with the media asset in an entry of a functions database containing a plurality of media assets and associated functions;
   determining whether the user is not at home;
   in response to determining that the user is not at home, replacing the entry in the functions database for the media asset with a recording function;
   subsequent to replacing the entry in the functions database for the media asset with the recording function:
      determining whether the user is at home;
      in response to determining that the user is at home, determining whether the recording function associated with the media asset has begun; and
      in response to determining the recording function associated with media asset has not begun, replacing the entry in the database for the media asset with the first function.

2. The method of claim 1, wherein the first function is at least one of:
   a reminder message for an episode or series;
   an entry of a watch list;
   an entry of a favorite program list; and
   an entry of a general interest list in a user profile.

3. The method of claim 1, wherein in response to receiving the indication that the user is not at home, updating the entry in the database for the media asset to include a recording function comprises:
   determining, based on hardware limitations, a number of media assets that can be recorded;
   retrieving the entry in the functions database for the media asset;
   assigning a priority to the media asset;
   comparing the priority of the media asset to priorities of the plurality of media assets stored in the functions database;
   determining whether a first number of media assets, given by the media asset in addition to media assets with a higher priority than the media asset, is less than the number of media assets that can be recorded; and
   in response to determining the first number of media assets is less than the number of media assets that can be recorded, updating the entry in the database for the media asset to include a recording function.

4. The method of claim 3, wherein assigning the priority to the media asset comprises:
   determining, from the command indicating interest in the media asset, an identity of the user;
   accessing a user profile corresponding to the user stored in the database;
   comparing characteristics of the media asset to characteristics stored in the user profile; and
   determining the priority of the media asset based on the comparison.

5. The method of claim 3, wherein assigning the priority to the media asset comprises:
   presenting to the user options to customize the priorities of the plurality of media assets stored in the database containing the plurality of media assets and associated functions;
   receiving a selection by the user of a first option; and
   in response to the user selection, reassigning the priority of the media asset.

6. The method of claim 1, further comprising:
   determining that the user has returned home;
   determining, from a recording log stored in the functions database, whether the media asset was recorded in response to updating the entry for the media asset to include the recording function;
   in response to determining the media asset was recorded in response to updating the entry for the media asset to include the recording function, generating for display a notification that the media asset was recorded;
   generating for display a selectable option to not record the media asset;
   receiving a selection from the user of the selectable option to not record the media asset;
   in response to receiving the selection, storing, in the database containing a plurality of media assets and associated functions, an instruction to not update the entry for the media asset to include the recording function during a next time the system determines the user is not at home.

7. The method of claim 6, further comprising:
   retrieving, from the recording log, an indication of the user associated with the command; and
   generating for display an identifier of the user and that the media asset was recorded in response to determining the user indicated interest in the media asset.

8. The method of claim 6, further comprising:
   accessing the recording log stored in the functions database;
   generating for display an entry in the recording log including an identifier of the media asset, the associated function of the media asset, and an indication of whether to record the media asset;
   receiving a user selection to edit the entry; and
   updating the entry in the recording log based on the user edits.

9. A system for automatically recording media assets not explicitly scheduled for recording by a user, the system comprising:
   display circuitry;
   storage circuitry; and
   control circuitry configured to:
      access a social media profile associated with the user;
      retrieve information relating to a social media activity performed by the user from the social media profile;

retrieve, from a media asset database at the storage circuitry, identifying information of one or more media assets;

compare the retrieved information relating to the social media activity with the identifying information of the one or more media assets;

determine, based on the comparing, that the user has indicated a reference identifying a media asset in the social media activity;

determine, from a context of the social media activity, that the reference constitutes a command indicating interest in the media asset;

associate, based on the command of interest determined from the context of the social media activity, a first function with the media asset, wherein the first function is not a recording function;

store the association of the first function with the media asset in an entry of a functions database containing a plurality of media assets and associated functions;

determine whether the user is not at home;

in response to determining that the user is not at home, replace the entry in the functions database for the media asset with a recording function;

subsequent to replacing the entry in the functions database for the media asset with the recording function:
- determine whether the user is at home;
- in response to determining that the user is at home, determine whether the recording function associated with the media asset has begun; and
- in response to determining the recording function associated with media asset has not begun, replace the entry in the database for the media asset with the first function.

10. The system of claim 9, wherein the first function is at least one of:
- a reminder message for an episode or series;
- an entry of a watch list;
- an entry of a favorite program list; and
- an entry of a general interest list in a user profile.

11. The system of claim 9, wherein the control circuitry configured to, in response to receiving the indication that the user is not at home, update the entry in the database for the media asset to include a recording function is configured to:
- determine, based on hardware limitations, a number of media assets that can be recorded;
- retrieve the entry in the functions database for the media asset;
- assign a priority to the media asset;
- compare the priority of the media asset to priorities of the plurality of media assets stored in the functions database;
- determine whether a first number of media assets, given by the media asset in addition to media assets with a higher priority than the media asset, is less than the number of media assets that can be recorded; and
- in response to determining the first number of media assets is less than the number of media assets that can be recorded, update the entry in the database for the media asset to include a recording function.

12. The system of claim 11, wherein the control circuitry configured to assign the priority to the media asset is configured to:
- determine, from the command indicating interest in the media asset, an identity of the user;
- access a user profile corresponding to the user stored in the database;
- compare characteristics of the media asset to characteristics stored in the user profile; and
- determine the priority of the media asset based on the comparison.

13. The system of claim 11, wherein the control circuitry configured to assign the priority to the media asset is configured to:
- present to the user options to customize the priorities of the plurality of media assets stored in the database containing the plurality of media assets and associated functions;
- receive a selection by the user of a first option; and
- in response to the user selection, reassign the priority of the media asset.

14. The system of claim 9, wherein the control circuitry is further configured to:
- determine that the user has returned home;
- determine, from a recording log stored in the functions database, whether the media asset was recorded in response to updating the entry for the media asset to include the recording function;
- in response to determining the media asset was recorded in response to updating the entry for the media asset to include the recording function, generate for display a notification that the media asset was recorded;
- generate for display a selectable option to not record the media asset;
- receive a selection from the user of the selectable option to not record the media asset;
- in response to receiving the selection, store, in the database containing a plurality of media assets and associated functions, an instruction to not update the entry for the media asset to include the recording function during a next time the system determines the user is not at home.

15. The system of claim 14, wherein the control circuitry is further configured to:
- retrieve, from the recording log, an indication of the user associated with the command; and
- generate for display an identifier of the user and that the media asset was recorded in response to determining the user indicated interest in the media asset.

16. The system of claim 14, wherein the control circuitry is further configured to:
- access the recording log stored in the functions database;
- generate for display an entry in the recording log including an identifier of the media asset, the associated function of the media asset, and an indication of whether to record the media asset;
- receive a user selection to edit the entry; and
- update the entry in the recording log based on the user edits.

* * * * *